US012659465B2

(12) United States Patent
Pfaff et al.

(10) Patent No.:  US 12,659,465 B2
(45) Date of Patent:      Jun. 16, 2026

(54) INTRA-PREDICTION MODE CONCEPT FOR BLOCK-WISE PICTURE CODING

(71) Applicant: Fraunhofer-Gesellschaft zur Förderung der angewandten Forschung e.V., Munich (DE)

(72) Inventors: Jonathan Pfaff, Berlin (DE); Philipp Helle, Berlin (DE); Dominique Maniry, Berlin (DE); Thomas Wiegand, Berlin (DE); Wojciech Samek, Berlin (DE); Stephan Kaltenstadler, Berlin (DE); Heiko Schwarz, Berlin (DE); Detlev Marpe, Berlin (DE); Mischa Siekmann, Berlin (DE); Martin Winken, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/389,665

(22) Filed: Dec. 19, 2023

(65) Prior Publication Data

US 2024/0137500 A1      Apr. 25, 2024

Related U.S. Application Data

(63) Continuation of application No. 17/839,459, filed on Jun. 13, 2022, now Pat. No. 11,889,066, which is a (Continued)

(30) Foreign Application Priority Data

Oct. 13, 2017      (EP) .................................... 17196402

(51) Int. Cl.
| | |
|---|---|
| *H04N 19/11* | (2014.01) |
| *H04N 19/109* | (2014.01) |

(Continued)

(52) U.S. Cl.
CPC ......... *H04N 19/109* (2014.11); *H04N 19/176* (2014.11); *H04N 19/61* (2014.11)

(58) Field of Classification Search
CPC ..... H04N 19/109; H04N 19/176; H04N 19/61
See application file for complete search history.

(56) References Cited

U.S. PATENT DOCUMENTS

| | | | |
|---|---|---|---|
| 10,171,813 B2 | 1/2019 | Zheng et al. | |
| 11,197,013 B2 | 12/2021 | Lee et al. | |

(Continued)

FOREIGN PATENT DOCUMENTS

| | | |
|---|---|---|
| CN | 111901592 A | 11/2020 |
| EP | 2063644 A2 | 5/2009 |

(Continued)

OTHER PUBLICATIONS

Cui, Wenzue, et al.; "Convolutional Neural Networks Based Intra Prediction for HEVC"; Research Gate Conference Paper; Apr. 2017; 11 pages.

(Continued)

*Primary Examiner* — James T Boylan
(74) *Attorney, Agent, or Firm* — Conley Rose, P.C.

(57)      ABSTRACT

In accordance with a first aspect, an improved compression efficiency is achieved by letting a block-wise picture codec support a set of intra-prediction modes according to which the intra-prediction signal for a current block of a picture is determined by applying a set of neighboring samples of the current block onto a neural network. A second aspect of the present application is that, additionally or alternatively to the spending of neural network-based intra-prediction modes, the mode selection may be rendered more effective by the usage of a neural network dedicated to determine a rank or a probability value for each of the set of intra-prediction modes by applying a set of neighboring samples thereonto (Continued)

with the rank or probability value being used for the selection of one intra-prediction mode out of the plurality of intra-prediction modes including or coinciding with the set of intra-prediction modes.

15 Claims, 12 Drawing Sheets

Related U.S. Application Data continuation of application No. 16/845,715, filed on Apr. 10, 2020, now Pat. No. 11,363,259, which is a continuation of application No. PCT/EP2018/077609, filed on Oct. 10, 2018.

(51) Int. Cl.
H04N 19/176 (2014.01)
H04N 19/61 (2014.01)

(56) References Cited

U.S. PATENT DOCUMENTS

| | | | |
|---|---|---|---|
| 2009/0110070 A1 | 4/2009 | Takahashi et al. | |
| 2012/0327999 A1 | 12/2012 | Francois et al. | |
| 2013/0016773 A1 | 1/2013 | Oh et al. | |
| 2013/0279582 A1* | 10/2013 | Sugimoto | H04N 19/119 |
| | | | 375/240.12 |
| 2015/0023406 A1 | 1/2015 | Lee et al. | |
| 2018/0184123 A1* | 6/2018 | Terada | G06T 9/002 |

| | | |
|---|---|---|
| 2020/0236349 A1 | 7/2020 | Zhai et al. |
| 2021/0127140 A1 | 4/2021 | Miska et al. |
| 2021/0218997 A1 | 7/2021 | Rezazadegan Tavakoli et al. |

FOREIGN PATENT DOCUMENTS

| | | |
|---|---|---|
| EP | 3310058 A1 | 4/2018 |
| JP | 2009111691 A | 5/2009 |
| JP | 2013012791 A | 1/2013 |
| WO | 2016199330 A1 | 12/2016 |

OTHER PUBLICATIONS

Li, Jiahao, et al.; "Intra Prediction Fully Connected Network For Video Coding"; IEEE; 2017; 5 pages.

Pfaff, Jonathan et al., "Intra prediction modes based on neural networks", Joint Video Experts Team (JVET) of ITU-T SG 16 WP 3 and ISO/IEC JTC1/SC 29/WG 11 10th Meeting: San Diego, US, Apr. 10-20, 2018, [JVET-J0037-v1], JVET-J0037 (version 1), ITU-T, Apr. 3, 2018, JVET-J0037.docx: pp. 1-14.

Sun et al. (Enhanced Intra Prediction for Video Coding by Using Multiple Neural Networks), IEEE vol. 22 No. 11, Nov. 2020.

Toyozaki, Tomohiro et al., "Fast Intra Prediction Mode Decision Method for HEVC Coding by using Deep Learning in HEVC Intra Coding", Proceedings of the 2016 ITE Winter Annual Convention Proceedings of the 2016 ITE Winter Annual Convention, Dec. 7, 2016, 12B-6, p. 1.

Wein "Intra Prediction" HEVC Jan. 10, 2015. Retrieved from the Internet: URL:https://www.hevcbook.de/intra-prediction/* the whole document *.

* cited by examiner

INTRA-PREDICTION MODE CONCEPT FOR BLOCK-WISE PICTURE CODING

CROSS-REFERENCES TO RELATED APPLICATIONS

This application is a continuation of U.S. application Ser. No. 17/839,459 filed Jun. 13, 2022, which is a continuation of U.S. application Ser. No. 16/845,715 filed Apr. 10, 2020 and issued as U.S. Pat. No. 11,363,259, which is a continuation of International Application No. PCT/EP2018/077609 filed Oct. 10, 2018, which claims priority from European Application No. 17196402.6 filed Oct. 13, 2017 with the European Patent Office, all of which are incorporated herein by reference in their entirety.

BACKGROUND OF THE INVENTION

The present application is concerned with an improved intra-prediction mode concept for block-wise picture coding such as usable in a video codec such as HEVC or any successor of HEVC.

Intra-prediction modes are widely used in picture and video coding. In video coding, intra-prediction modes compete with other prediction modes such as inter-prediction modes such as motion-compensated prediction modes. In intra-prediction modes, a current block is predicted on the basis of neighboring samples, i.e. samples already encoded as far as the encoder side is concerned, and already decoded as far as the decoder side is concerned. Frankly speaking, neighboring sample values are extrapolated into the current block so as to form a prediction signal for the current block with the prediction residual being transmitted in the datastream for the current block. The better the prediction signal is, the lower the prediction residual is and, accordingly, a lower number of bits is needed to code the prediction residual.

In order to be effective, several aspects should be taken into account in order to form an effective frame work for intra-prediction in a block-wise picture coding environment. For instance, the larger the number of intra-prediction modes supported by the codec, the larger the side information rate consumption is in order to signal the selection to the decoder. On the other hand, the set of supported intra-prediction modes should be able to provide a good prediction signal, i.e. a prediction signal resulting in a low prediction residual.

SUMMARY

An embodiment may have an apparatus for block-wise decoding a picture from a data stream, the apparatus supporting a plurality of intra prediction modes having at least a set of intra-prediction modes according to which the intra-prediction signal for a current block of the picture is determined by applying a first set of neighboring samples of the current block onto a neural network or a sequence of one or more linear functions in which each linear function is followed by a respective non-linear function, the apparatus configured to select for the current block one intra-prediction mode out of the plurality of intra-prediction modes, and predict the current block using the one intra-prediction mode.

Another embodiment may have an apparatus for block-wise encoding a picture into a data stream, the apparatus supporting a plurality of intra prediction modes having at least a set of intra-prediction modes according to which the intra-prediction signal for a current block of the picture is determined by applying a first set of neighboring samples of the current block onto a neural network or a sequence of one or more linear functions in which each linear function is followed by a respective non-linear function, the apparatus configured to select for the current block one intra-prediction mode out of the plurality of intra-prediction modes, and predict the current block using the one intra-prediction mode.

Another embodiment may have an apparatus for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, configured to apply, for each of the set of intra-prediction modes, a first set of neighboring samples neighboring a first picture test block onto the first neural network or first sequence of one or more first linear functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determine, for each of the set of intra-prediction modes, a cost estimate for coding costs related to prediction error coding and mode signalization using the prediction signal acquired for the respective intra-prediction mode; update first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; apply neighboring samples neighboring a second picture test block onto the first neural network or first sequence of one or more first linear functions for each of the set of intra-prediction modes and onto the second neural network or second sequence of one or more second linear functions with the first and second parameters updated.

Another embodiment may have an apparatus for block-wise decoding a picture from a data stream, the apparatus supporting a plurality of intra prediction modes, the apparatus configured to determine, for each of at least a set of intra prediction modes of the plurality of intra prediction modes, a rank or a probability value by applying a first set of neighboring samples neighboring a current block onto a neural network or a sequence of one or more linear functions in which each linear function is followed by a respective non-linear function, select for the current block one intra-prediction mode out of the plurality of intra-prediction modes using the rank or probability value, and predict the current block using the one intra-prediction mode.

Another embodiment may have an apparatus for block-wise encoding a picture into a data stream, the apparatus supporting a plurality of intra prediction modes, the apparatus configured to determine, for each of at least a set of intra prediction modes of the plurality of intra prediction modes, a rank or a probability value by applying a first set of neighboring samples neighboring a current block onto a neural network or a sequence of one or more linear functions in which each linear function is followed by a respective non-linear function, select for the current block one intra-prediction mode out of the plurality of intra-prediction modes using the rank or probability value, predict the current block using the one intra-prediction mode.

Another embodiment may have an apparatus for designing a neural network or a sequence of one or more linear functions in which each linear function is followed by a respective non-linear function for assisting in selecting among a set of intra-prediction modes for block-based picture coding, configured to predict, using each of the set of intra-prediction modes, a first picture test block from a first set of neighboring samples neighboring the first picture test block so as to acquire, for each of the set of intra-prediction modes, a prediction signal for the first test block, and apply the first set of neighboring samples onto the neural network or a sequence of one or more linear functions in which each linear function is followed by a respective non-linear function so as to acquire, for each of the set of intra-prediction modes, a probability value indicative of a probability of the respective intra-prediction mode; determine, for each of the set of intra-prediction modes, a cost estimate for coding costs related to prediction error coding and mode signalization using the prediction signal acquired for the respective intra-prediction mode; update parameters of the neural network or sequence of one or more linear functions so as to reduce a coding cost function having a first addend forming a residual rate estimate depending on the prediction signal acquired for the intra-prediction mode of lowest coding cost estimate, and a second addend forming a mode signaling side information rate estimate depending on the prediction signal and the probability value acquired for the intra-prediction mode of lowest coding cost estimate; redo the prediction and application for a second prediction text block and its set of neighboring samples with the parameters updated.

Another embodiment may have a method for block-wise decoding a picture from a data stream, with supporting a plurality of intra prediction modes having at least a set of intra-prediction modes according to which the intra-prediction signal for a current block of the picture is determined by applying a first set of neighboring samples of the current block onto a neural network or a sequence of one or more linear functions in which each linear function is followed by a respective non-linear function, the method having selecting for the current block one intra-prediction mode out of the plurality of intra-prediction modes, and predicting the current block using the one intra-prediction mode.

Another embodiment may have a method for block-wise encoding a picture into a data stream, with supporting a plurality of intra prediction modes having at least a set of intra-prediction modes according to which the intra-prediction signal for a current block of the picture is determined by applying a first set of neighboring samples of the current block onto a neural network or a sequence of one or more linear functions in which each linear function is followed by a respective non-linear function, the method having selecting for the current block one intra-prediction mode out of the plurality of intra-prediction modes, and predicting the current block using the one intra-prediction mode.

Another embodiment may have a method for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, the method having applying, for each of the set of intra-prediction modes, a first set of neighboring samples neighboring a first picture test block onto the first neural network or first sequence of one or more linear first functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; applying neighboring samples neighboring a second picture test block onto the first neural network or first sequence of first linear functions for each of the set of intra-prediction modes and onto the second neural network or second sequence of second linear functions with the first and second parameters updated.

Another embodiment may have a method for block-wise decoding a picture from a data stream, with supporting a plurality of intra prediction modes, the method having determining, for each of at least a set of intra prediction modes of the plurality of intra prediction modes, a rank or a probability value by applying a first set of neighboring samples neighboring a current block onto a neural network or a sequence of one or more linear functions in which each linear function is followed by a respective non-linear function, selecting for the current block one intra-prediction mode out of the plurality of intra-prediction modes using the rank or probability value, and predicting the current block using the one intra-prediction mode.

Another embodiment may have a method for block-wise encoding a picture into a data stream, with supporting a plurality of intra prediction modes, the method having determining, for each of at least a set of intra prediction modes of the plurality of intra prediction modes, a rank or a probability value by applying a first set of neighboring samples neighboring a current block onto a neural network or a sequence of one or more linear functions in which each linear function is followed by a respective non-linear function, selecting for the current block one intra-prediction mode out of the plurality of intra-prediction modes using the rank or probability value, predicting the current block using the one intra-prediction mode.

Another embodiment may have a method for designing a neural network or a sequence of one or more linear functions in which each linear function is followed by a respective non-linear function for assisting in selecting among a set of intra-prediction modes for block-based picture coding, the method having predicting, using each of the set of intra-prediction modes, a first picture test block from a first set of neighboring samples neighboring the first picture test block so as to acquire, for each of the set of intra-prediction modes, a prediction signal for the first test block, and apply the first set of neighboring samples onto the neural network or sequence of one or more linear functions so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating parameters of the neural network or sequence of one or more linear functions so as to reduce a coding cost function having a first addend forming a residual rate estimate depending on the prediction signal acquired for the intra-prediction mode of lowest coding cost estimate, and a second addend forming a mode signaling side information rate estimate depending on the prediction signal and the probability value acquired for the intra-prediction mode of lowest coding cost estimate; redo the prediction and application for a second prediction text block and its set of neighboring samples with the parameters updated.

Another embodiment may have a data stream generated using a method for block-wise encoding a picture into a data stream, with supporting a plurality of intra prediction modes having at least a set of intra-prediction modes according to which the intra-prediction signal for a current block of the picture is determined by applying a first set of neighboring samples of the current block onto a neural network or a sequence of one or more linear functions in which each linear function is followed by a respective non-linear function, the method having selecting for the current block one intra-prediction mode out of the plurality of intra-prediction modes, and predicting the current block using the one intra-prediction mode.

Another embodiment may have a data stream generated using a method for block-wise encoding a picture into a data stream, with supporting a plurality of intra prediction modes, the method having determining, for each of at least a set of intra prediction modes of the plurality of intra prediction modes, a rank or a probability value by applying a first set of neighboring samples neighboring a current block onto a neural network or a sequence of one or more linear functions in which each linear function is followed by a respective non-linear function, selecting for the current block one intra-prediction mode out of the plurality of intra-prediction modes using the rank or probability value, predicting the current block using the one intra-prediction mode.

Another embodiment may have a digital storage medium storing a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, wherein the first neural network or first sequence of one or more first linear functions for each of the set of intra-prediction modes is acquired by the method for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, the method having applying, for each of the set of intra-prediction modes, a first set of neighboring samples neighboring a first picture test block onto the first neural network or first sequence of one or more linear first functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; applying neighboring samples neighboring a second picture test block onto the first neural network or first sequence of first linear functions for each of the set of intra-prediction modes and onto the second neural network or second sequence of second linear functions with the first and second parameters updated.

Another embodiment may have an apparatus for block-wise decoding a picture from a data stream, the apparatus supporting a plurality of intra prediction modes having at least a set of intra-prediction modes according to each which the intra-prediction signal for a current block of the picture is determined by applying a first set of neighboring samples of the current block onto a neural network or a sequence of one or more linear functions in which each linear function is followed by a respective non-linear function, which is associated with the respective intra prediction mode, the apparatus configured to select for the current block one intra-prediction mode out of the plurality of intra-prediction modes according to mode signalization in the data stream, and predict the current block using the one intra-prediction mode, wherein the neural network or sequence of one or more linear functions for each of the set of intra-prediction modes is acquired by the method for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, the method having applying, for each of the set of intra-prediction modes, a first set of neighboring samples neighboring a first picture test block onto the first neural network or first sequence of one or more linear first functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; applying neighboring samples neighboring a second picture test block onto the first neural network or first sequence of first linear functions for each of the set of intra-prediction modes and onto the second neural network or second sequence of second linear functions with the first and second parameters updated.

Another embodiment may have a method for block-wise decoding a picture from a data stream, the method supporting a plurality of intra prediction modes having at least a set of intra-prediction modes according to each which the intra-prediction signal for a current block of the picture is determined by applying a first set of neighboring samples of the current block onto a neural network or a sequence of one or more linear functions in which each linear function is followed by a respective non-linear function, which is associated with the respective intra prediction mode, the method having: selecting for the current block one intra-prediction mode out of the plurality of intra-prediction modes according to mode signalization in the data stream, and predicting the current block using the one intra-prediction mode, wherein the neural network or sequence of one or more linear functions for each of the set of intra-prediction modes is acquired by the method for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, the method having applying, for each of the set of intra-prediction modes, a first set of neighboring samples neighboring a first picture test block onto the first neural network or first sequence of one or more linear first functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; applying neighboring samples neighboring a second picture test block onto the first neural network or first sequence of first linear functions for each of the set of intra-prediction modes and onto the second neural network or second sequence of second linear functions with the first and second parameters updated.

Another embodiment may have a non-transitory digital storage medium having a computer program stored thereon to perform the method for block-wise decoding a picture from a data stream, the method supporting a plurality of intra prediction modes having at least a set of intra-prediction modes according to each which the intra-prediction signal for a current block of the picture is determined by applying a first set of neighboring samples of the current block onto a neural network or a sequence of one or more linear functions in which each linear function is followed by a respective non-linear function, which is associated with the respective intra prediction mode, the method having: selecting for the current block one intra-prediction mode out of the plurality of intra-prediction modes according to mode signalization in the data stream, and predicting the current block using the one intra-prediction mode, wherein the neural network or sequence of one or more linear functions for each of the set of intra-prediction modes is acquired by the method for training a first neural network or a first sequence of one or more first linear functions in which each first linear function is followed by a respective first non-linear function, for each of a set of intra-prediction modes for block-based picture coding according to which an intra-prediction signal for a current block is determined by applying a first set of neighboring samples of the current block onto the first neural network or the first sequence of one or more first linear functions associated with the intra-prediction mode, the method having applying, for each of the set of intra-prediction modes, a first set of neighboring samples neighboring a first picture test block onto the first neural network or first sequence of one or more linear first functions associated with the respective intra-prediction mode so as to acquire, for each of the set of intra-prediction modes, a prediction signal for the first test block, and a second set of neighboring samples neighboring the first picture test block onto a second neural network or a second sequence of one or more second linear functions in which each second linear function is followed by a respective second non-linear function so as to acquire, for each of the set of intra-prediction modes, a probability value indicative of a probability of the respective intra-prediction mode; determining, for each of the set of intra-prediction modes, a cost estimate for coding costs related to prediction error coding and mode signalization using the prediction signal acquired for the respective intra-prediction mode; updating first parameters of the first neural network or first sequence of one or more first linear functions for each of the set of intra-prediction modes and second parameters of the second neural network or second sequence of one or more second linear functions so as to reduce a coding cost function having a first addend forming a residual rate estimate depending on the prediction signal acquired for an intra-prediction mode of lowest coding cost estimate, and a second addend forming a mode signaling side information rate estimate depending on the prediction signal and the probability value acquired for the intra-prediction mode of lowest coding cost estimate; applying neighboring samples neighboring a second picture test block onto the first neural network or first sequence of first linear functions for each of the set of intra-prediction modes and onto the second neural network or second sequence of second linear functions with the first and second parameters updated, when said computer program is run by a computer.

In accordance with a first aspect of the present application, an improved compression efficiency is achieved by letting a block-wise picture codec support a set of intra-prediction modes according to which the intra-prediction signal for a current block of a picture is determined by applying a set of neighboring samples of the current block onto a neural network. This set may form the plurality of intra-prediction modes supported completely or merely a proper subset thereof. Among the plurality of intra-prediction modes supported, one is selected for the current block and the current block is predicted using the one intra-prediction mode, i.e. the selected one. The datastream may be provided with an index for the current block which indicates the selected intra-prediction mode. Providing a block-wise picture codec with more than one neural network-based intra-prediction modes between which a selection is performed for a current block, enables designing these neural network-based intra-prediction modes so as to find for a certain block with an increased likelihood a prediction signal of low prediction error. Additionally, the neural network intra-prediction mode design may be performed in such a manner that, if side information for intra-prediction mode selection is spent, this side information overhead may be kept low. This is made feasible by the fact that the intra-prediction mode design is free to generate the neural network-based intra-prediction modes in a manner of mutually different frequency of selection among intra-predicted picture blocks. In other words, spending a plurality of neural network-based intra-prediction modes enables a design of these modes in such a manner that their statistical frequency of selection fits to the selection signalization in a manner leading to an entropic coding sense lower side information overhead than compared to selecting among heuristically designed intra-prediction mode sets. For instance, an index pointing to the selected intra-prediction mode may be coded using variable length code or using entropy coding and the neural network-based intra-prediction modes may be designed in a manner so that their frequencies of selection or frequency distribution is adapted to the variable length code such, or their frequency distribution is adapted to the underlying sample statistics of the entropy code such that the mean signalization overhead for the mode selection among the intra-prediction modes is reduced or minimized.

A second aspect of the present application is that, additionally or alternatively to the spending of neural network-based intra-prediction modes, the mode selection may be rendered more effective by the usage of a neural network dedicated to determine a rank or a probability value for each of the set of intra-prediction modes by applying a set of neighboring samples thereonto with the rank or probability value being used for the selection of one intra-prediction mode out of the plurality of intra-prediction modes including or coinciding with the set of intra-prediction modes. The side information overhead for selecting among the intra-prediction modes may be left off completely, or may be rendered more efficient by using the neural network.

As far as the design of the above-mentioned neural networks is concerned, the present application provides many embodiments for appropriately determining parameters thereof.

DETAILED DESCRIPTION OF THE INVENTION

In the following, various embodiments are described which assist in achieving a more effective compression when using intra-prediction. Some embodiments achieve the compression efficiency increase by spending a set of intra-prediction modes which are neural network-based. The latter ones may be added to other intra-prediction modes heuristically designed, for instance, or may be provided exclusively. Other embodiments use a neural network in order to perform a selection among a plurality of intra-prediction modes. And even other embodiments make use of both of the just-discussed specialties.

Figure 1:
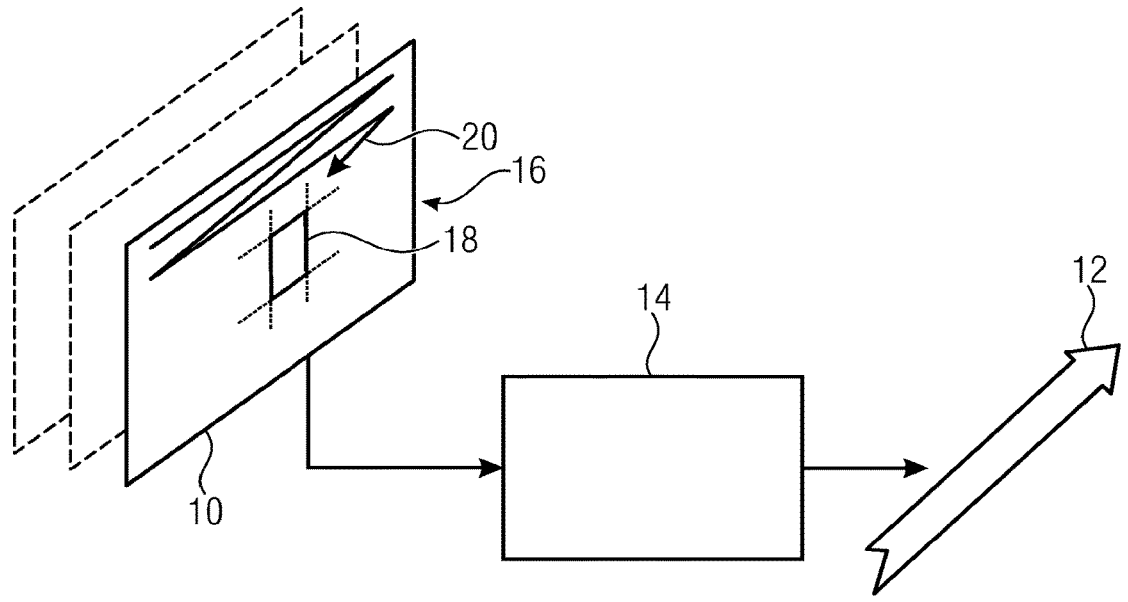
FIG. 1 shows a schematic block diagram illustrating an encoder for encoding a picture into a datastream as a general example where embodiments of the present application may be implemented.

In order to ease the understanding of the following embodiments of the present application, the description starts with a presentation of possible encoders and decoders fitting thereto into which the subsequently outlined embodiments of the present application could be built. FIG. 1 shows an apparatus for block-wise encoding a picture 10 into a datastream 12. The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively.

As mentioned, encoder 14 performs the encoding in a block-wise manner or block-base. To this, encoder 14 subdivides picture 10 into blocks a team in units of which encoder 14 encodes picture 10 into datastream 12. Examples of possible subdivisions of picture 10 into blocks 18 are set out in more detail below. Generally, the subdivision may end-up into blocks 18 of constant size suggest an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following embodiments, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf notes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support intra-prediction modes according to which a block 18 is temporarily predicted from a previously encoded picture of video 16. Such an intra-prediction mode may be a motion-compensated prediction mode according to which a motion vector is signaled for such a block 18 indicating a relative spatial offset of the portion from which the prediction signal of block 18 is to be derived as a copy. Additionally or alternatively, other non-intra-prediction modes may be available as well such as inter-view prediction modes in case of encoder 14 being a multi-view encoder, or non-predictive modes according to which the inner of block 18 is coded as is, i.e. without any prediction.

Figure 2:
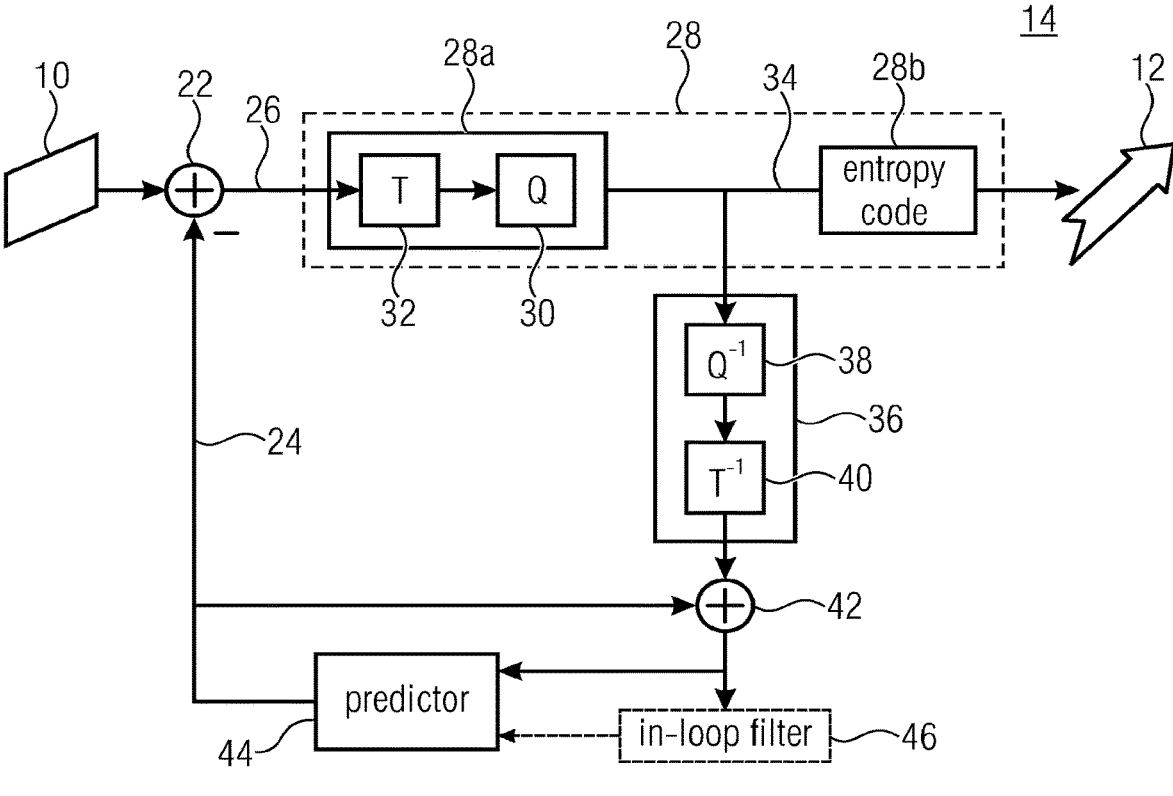
FIG. 2 shows a block diagram of a more specific example for an encoder according to FIG. 1.

Before starting with focusing the description of the present application onto intra-prediction modes, a more specific embodiment for a possible block-based encoder, i.e. for a possible implementation of encoder 14, as described with respect to FIG. 2 with then presenting two corresponding embodiments for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. encoder 14 comprises an adder 42 which adds the reconstructed prediction residual signal as output by inverse transformer 40 and the prediction signal 24 so as to output a reconstructed signal, i.e. reconstruct examples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
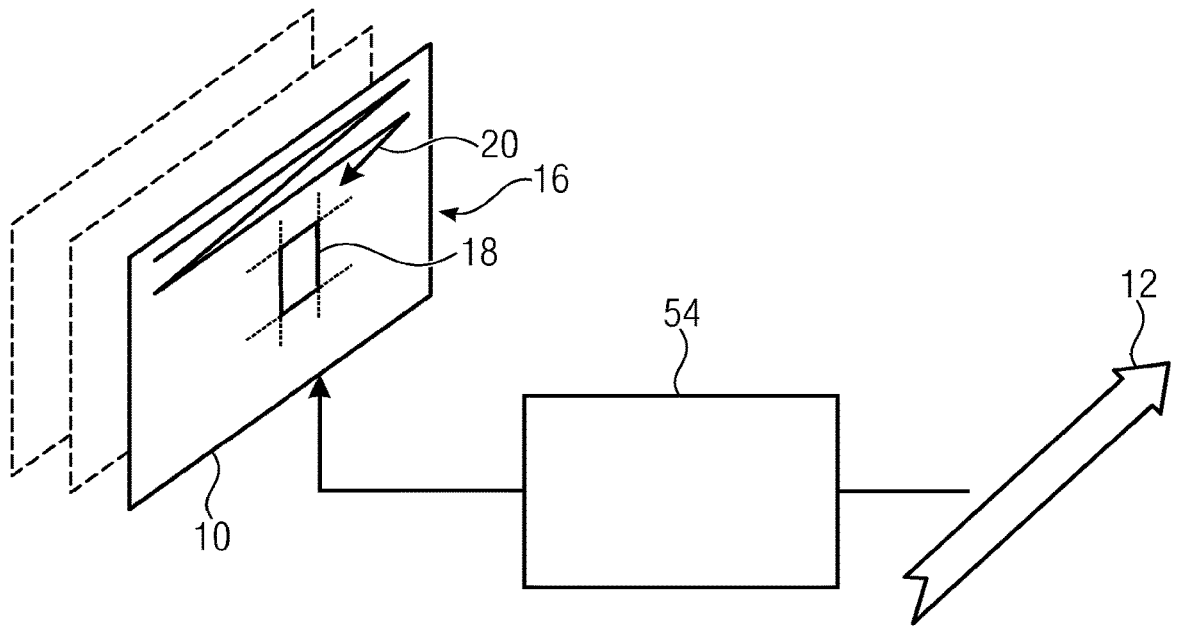
FIG. 3 shows a schematic block diagram illustrating a decoder fitting to the encoder of FIG. 1 and serving as an example for a decoder where embodiments of the present application may be implemented into.

A decoder or apparatus for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization suggest, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-bases and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
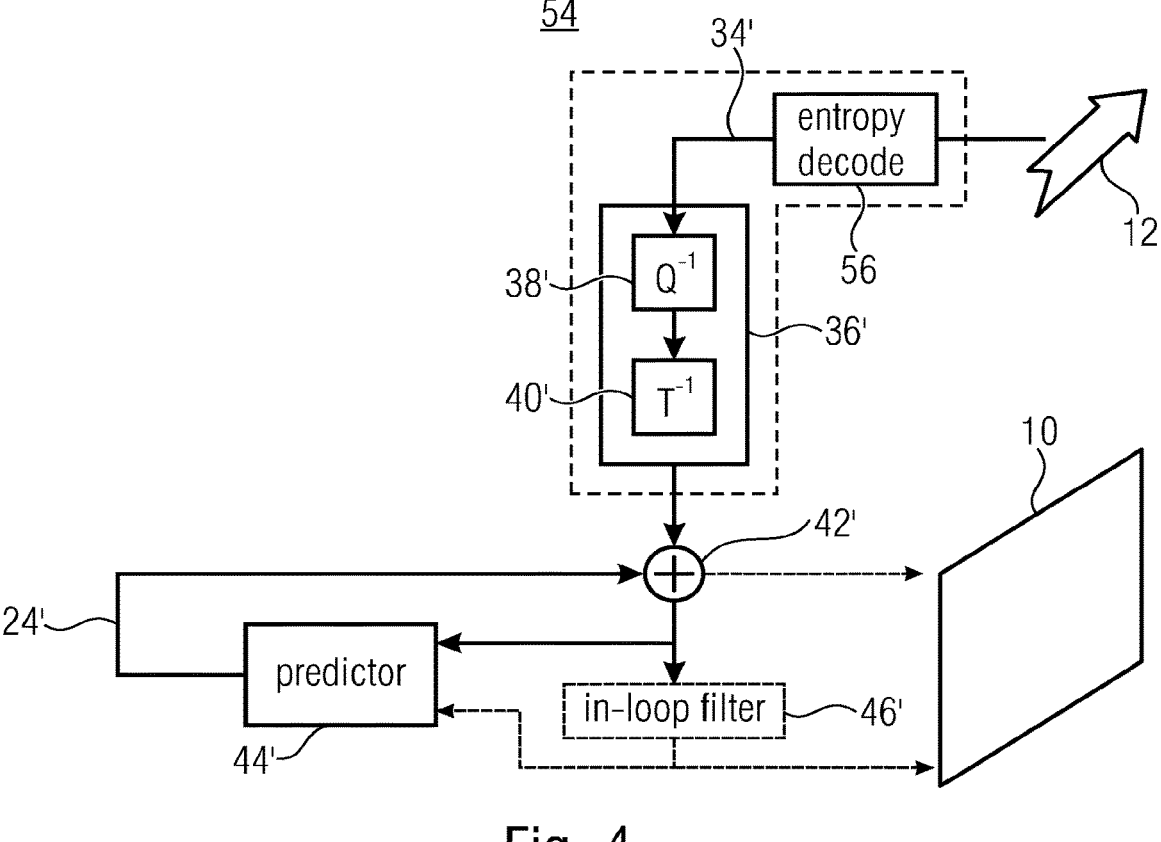
FIG. 4 shows a block diagram of a more specific example of a decoder of FIG. 3, which fits to the encoder of FIG. 2.

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to added 42' is derived by a sequence of entropy decoder 56 which inverses the entropy encoding of entropy encoder 28b, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

Before proceeding with the description of possible embodiments of the present application, some notes shall be made with respect to the above examples. Although not explicitly mentioned above, it is clear that block 18 may have any shape. It may be, for instance, of rectangular or quadratic shape. Moreover, although the above description of the mode of operation of encoder 14 and decoder 54 often mentioned a "current block" 18 it is clear that encoder 14 and decoder 54 act accordingly for each block for which an intra-prediction mode is to be selected. As described above, there may be other blocks as well, but the following description focuses on those blocks 18 into which picture 10 is subdivided, for which an intra-prediction mode is to be selected.

Figure 5:
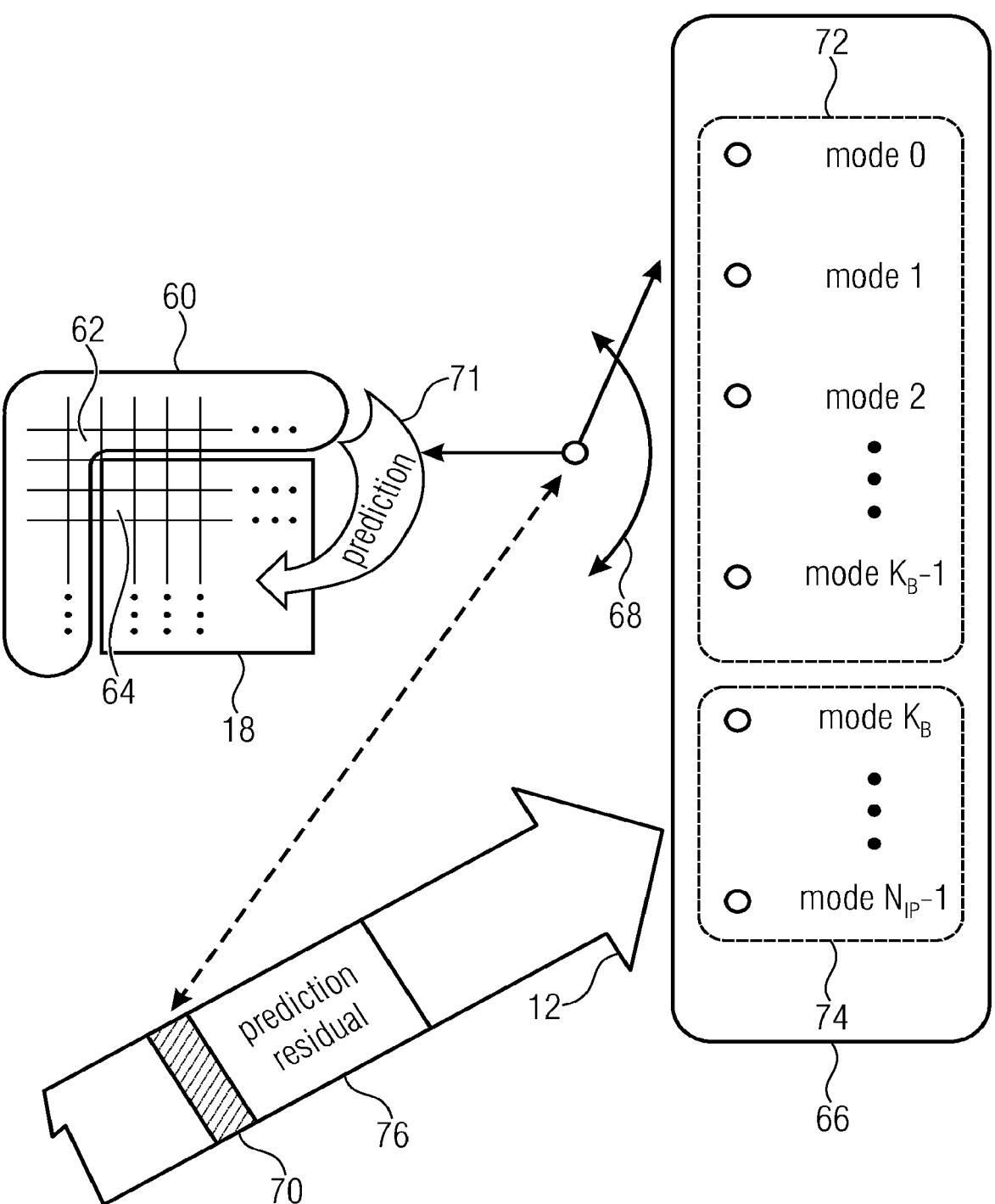
FIG. 5 shows a schematic diagram illustrating the mode of operation in encoder and decoder according to embodiments of the present application with respect to processing a block using intra-prediction.

In order to summarize the situation for a certain block 18 for which an intra-prediction mode is to be selected, reference is made to FIG. 5. FIG. 5 shows a current block 18, i.e. a block currently to be encoded or decoded. FIG. 5 shows a set 60 of neighboring samples 62, i.e. samples 62 with spatially neighbor block 18. The samples 64 within block 18 are to be predicted. The prediction signal to be derived is, thus, a prediction for each sample 64 within block 18. As already discussed above, a plurality 66 of prediction modes are available for each block 18 and if block 18 is to be intra-predicted, this plurality 66 of modes merely comprises inter-prediction modes. A selection 68 is performed at encoder and decoder side in order to determine one of the intra-prediction modes out of the plurality 66 to be used to predict 71 the prediction signal for block 18 on the basis of the neighboring sample set 60. The embodiments described further below differ with respect to the available intra-prediction modes 66 and the mode of operation with respect to selection 68 suggest, for instance, whether side information is set in the datastream 12 with respect to selection 68 with respect to block 18 or not. The description of these embodiments, however, starts with a concrete description providing mathematical details. According to this initial embodiment, the selection for a certain block 18 to be intra-predicted is associated with corresponding side information signalization 70 and the datastream and the plurality 66 of intra-prediction modes comprises a set 72 of neural network-based intra-prediction modes as well as a set 74 of further intra-prediction mode of heuristic design. One of the intra-prediction modes of mode 74 may, for instance, be a DC prediction mode according to which some mean value is determined on the basis of the neighboring sample set 60 and this mean value is assigned to all samples 64 within block 18. Additionally or alternatively, set 74 may comprise inter-prediction modes which may be called angular inter-prediction modes according to which sample values of the neighboring sample set 60 are copied into block 18 along a certain intra-prediction direction with this intra-prediction direction differing among such angular intra-prediction modes. FIG. 5 shows that the datastream 12 comprises, in addition to the optionally present side information 70 concerning the selection 68 out of the plurality 66 of intra-prediction modes, a portion 76 into which the prediction residual encoded which coding may, as discussed above, optionally involve transform coding with quantization in transform domain.

Figure 6:
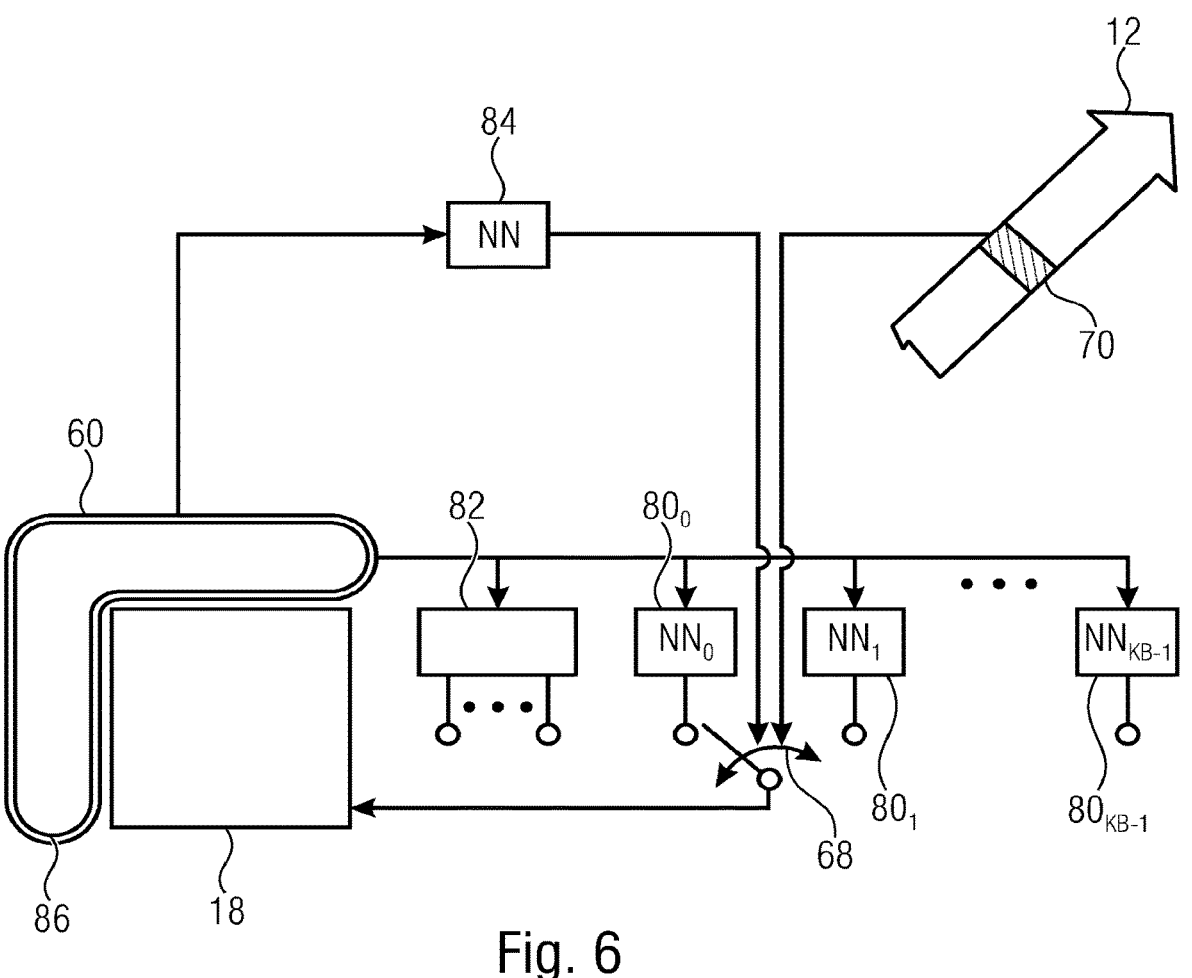
FIG. 6 shows a schematic block diagram illustrating a decoder in accordance with an embodiment of the present application comprising several neural network-based intra-prediction modes.

In particular, in order to ease the understanding of the following description of a specific embodiment of the present application, FIG. 6 shows the general mode of operation for an intra-prediction block at encoder and decoder. FIG. 6 shows block 18 along with the neighboring samples set 60 on the basis of which the intra-prediction is performed. It should be noted that this set 60 may vary among the intra-prediction modes of the plurality 66 of intra-prediction modes in terms of cardinality, i.e. the number of samples of set 60 actually used according to the respective intra-prediction mode for determining the prediction signal for block 18. This is, however, for ease of understanding, not depicted in FIG. 6. FIG. 6 shows that encoder and decoder have one neural network 80₀ to 80_{KB}−1 for each of the neural network-based intra-prediction modes of set 72. Set 60 is applied to the respective neural network so as to derive the corresponding intra-prediction mode among set 72. Besides this, FIG. 6 rather representatively shows one block 82 as providing on the basis of the input, namely the set 60 of neighboring samples, the one or more prediction signals of the one or more intra-prediction modes of set 74, e.g. the DC mode prediction signal and/or angular intra-prediction mode prediction signal. The following description will show as to how the parameters for the neural networks 80ᵢ with i=0 . . . $K_B$−1 may advantageously be determined. The specific embodiment set out hereinafter, also provides encoder and decoder with another neural network 84 which is dedicated to provide a probability value for each neural network-based intra-prediction mode within set 72 on the basis of a set 86 of neighboring samples which may or may not coincide with set 60. The probability values thus provided when the neural network 84 assists in rendering the side information 70 for the mode selection more effective. For instance, in the embodiment described below, it is assumed that a variable length code is used to point to one of the intra-prediction modes and at least as far as set 72 is concerned, the probability values provided by the neural network 84 enable to use the variable length code within the side information 70 as an index into an ordered list of intra-prediction modes ordered according to the probability values output by neural network 84 for the neural network-based intra-prediction modes within set 72, thereby optimizing or reducing the code rate for the side information 70. To this, as depicted in FIG. 6, the mode selection 68 is effectively performed depending on both, the probability values provided by the further neural network 84 as well as the side information 70 within datastream 12.

1. Algorithm to Train the Parameters of Neural Networks That Perform an Intra Prediction Let $B \subset \mathbb{Z}^2$ be a block of a video frame, i.e. block 18. Assume that B has M pixels. For a fixed color component, let im be the content of a video signal on B. We regard im as an element of $\mathbb{R}^M$. Assume that there exists a neighbourhood $B_{rec} \subset \mathbb{Z}^2$ of B that has L pixels and on which an already reconstructed image rec$\in \mathbb{R}^L$ is available, i.e. sample sets 60 and 86 although they may alternatively differ. By an intra-prediction-function, we mean a function $F: \mathbb{R}^L \rightarrow \mathbb{R}^M$. We regard F(rec) as a predictor for im.

What is described next is an algorithm to design, via a data-driven optimization approach, intra-prediction-functions for several blocks B that may occur in a typical hybrid video coding standard, namely set 72. In order to achieve that goal, we took the following main design features into account:

1. In the optimization algorithms that we conduct, we want to use a good approximation of the cost function that in particular involves the number of bits one can expect to spent to signal the prediction residual.
2. We want to train several intra predictions jointly in order to be able to handle different signal characteristics.
3. When training intra predictions, one has to take into account the number of bits needed to signal which intra mode is to be used.
4. We want to keep a set of already defined intra predictions, for example the HEVC intra predictions, and train our predictions as complementary predictions.
5. A typical hybrid video coding standard usually supports several blocks shapes into which the given block B can be partitioned.

In the next four sections, a possibility is to describe how one may deal with each of these requirements. More precisely, in section 1.1, we shall describe how to deal with the first item. In section 1.2, it is described how to handle items 2 to 3. In section 1.4, it is described how to take item 4 into account. Finally, in section 1.5, it is described how to deal with the last item.

1.1 Algorithm to Train a Loss Function That Approximates the Rate Function of a Video Codec A data driven approach to determine unknown parameters that are used in a video codec is usually set up as an optimization algorithm that tries to minimize a predefined loss function on a given set of training examples. Typically, for a numerical optimization algorithm to work in practice, the latter loss function should satisfy some smoothness requirements.

On the other hand, a video encoder like HEVC performs best when it makes its decisions my minimizing the Rate-Distortion costs $D+\lambda \cdot R$. Here, D is the reconstruction error of the decoded video signal and R is the rate, i.e. the number of bits needed to code the video signal. Moreover, $\lambda \in \mathbb{R}$ is a Lagrangian Parameter that depends on the chosen Quantization Parameter.

The true function $D+\lambda \cdot R$ is typically very complex and is not given by a closed expression on can feed a data driven optimization algorithm with. Thus, we approximate either the whole function $D+\lambda \cdot R$ or at least the rate function R by a piecewise smooth function.

More precisely, as before let B be a given block 1/ of a video frame 10 and let im be the corresponding video signal on B in a fixed color component. Assume that B has M pixels. Then for a prediction candidate pred $\in \mathbb{R}^M$, we consider the prediction residue res:=(im−pred)$\in \mathbb{R}^M$. For a given Quantization Parameter and a given transform, let R(res) be the rate that a true video encoder needs to signal the quantized transform of res. Moreover, let D(res) be the reconstruction error that arises by dequantization and inverse transform of res. Then we want to determine functions H, $\tilde{R}: \mathbb{R}^M \rightarrow \mathbb{R}$ which are piecewise smooth such that H(res) serves as a good approximation of $D(res)+\lambda \cdot R(res)$ and such that $\tilde{R}(res)$ serves as a good approximation of R(res).

We fix some $N \in \mathbb{N}$ and fix predefined "architectures", i.e. piecewise smooth functions $$\mathcal{H}: \mathbb{R}^M \times \mathbb{R}^N \rightarrow \mathbb{R}, \mathcal{R}: \mathbb{R}^M \times \mathbb{R}^N \rightarrow \mathbb{R}$$

and then seek $\Phi_1, \Phi_2 \in \mathbb{R}^N$, such that we model our functions H and $\tilde{R}$ as $$H(res) = \mathcal{H}(res, \Phi_1), \tilde{R}(res) = \mathcal{R}(res, \Phi_2).$$

In order to determine the weights $\Phi_1$ and $\Phi_2$, on a typical encoder that uses the given hybrid video coding standard we collected a huge set of training examples of prediction residues $res_j$, $j \in \mathcal{J}$, and the corresponding Rate-Distortion values $(D+\lambda R)(res_j)$ respectively only the rate values $R(res_j)$ for some finite large index set $\mathcal{J}$. Then we try to find $\Phi_1$ and $\Phi_2$ such that they minimize or at least make small the expressions $$\sum_{j \in \mathcal{J}} ((D+\lambda R)(res_j) - \mathcal{H}(res_j, \Phi_1)(res_j))^2,$$

$$\sum_{j \in \mathcal{J}} (R(res_j) - \mathcal{R}(res, \Phi_2)(res_j))^2.$$

For that task, we usually use a (stochastic) gradient descent approach.

1.2 Training of Predictions for a Fixed Block Shape

In this section we describe the algorithm that we set up to design $K_B$ intra-predictions for a given block B 18, the ones of st 72, and area $B_{rec}$ 60 for already reconstructed samples.

We assume that we are given a predefined "architecture" of our predictions. By this we mean that for some fixed $T \in \mathbb{N}$ we are given a function $$F^B: \mathbb{R}^L \times \mathbb{R}^T \rightarrow \mathbb{R}^M \qquad (1)$$

and that we want to determine "weights" $\Theta_{B,1}, \ldots \Theta_{B,K_B} \in \mathbb{R}^T$ such that out intra predictions are given as $$F^B_{\Theta_{B,k}}: \mathbb{R}^L \rightarrow \mathbb{R}^M,$$

where for $rec \in \mathbb{R}^L$ we put $$F^B_{\Theta_{B,k}}(rec) := F^B(rec, \Theta_{B,k}). \qquad (2)$$

The following section provides details in this regard. The functions in (2) define the neural network $\mathbf{80_0}$-$\mathbf{80}_{KB}$−1 in FIG. 6.

Next, we model the signalization cost for the intra modes that we try to design by using a second parameter-dependent function $$G^B: \mathbb{R}^L \times \mathbb{R}^T \rightarrow \mathbb{R}^{K_B}. \qquad (3)$$

Again, for $\Psi_B \in \mathbb{R}^L$, we define $$G_{\Psi_B}^B : \mathbb{R}^L \to \mathbb{R}^{K_B} \tag{4}$$

by $$G_\Psi^B(rec) := G^B(rec, \Psi_B).$$

Again, an example is given in section 1.3 with the function of (4) representing neural network 84 of FIG. 6.

We assume that we are given a function $$\mathcal{M}^B : \mathbb{R}^{K_B} \to \mathbb{R}^{K_B}.$$

This function, for instance, defines a VLC code length distribution used for side information 70. i.e. the code lengths assocaited by side information 70 with cad ponite more of set 72.

Then we define $$\mathcal{M}_{\Psi_B}^B : \mathbb{R}^L \to \mathbb{R}^{K_B}$$

by $$\mathcal{M}_{\Psi_B}^B(rec) := \mathcal{M}^B\big(G_{\Psi_B}^B(rec)\big).$$

For the time being, the k-th component $$\big(\mathcal{M}_{\Psi_B}^B(rec)\big)_k \in \mathbb{R}$$

of $$\mathcal{M}_{\Psi_B}^B(rec)$$

shall model the number of bits needed to signal the k-th intra mode that we train.

If $\tilde{R}$ is the function defined in section 2.1, for given $$\Theta_1^B, \dots, \Theta_{K_B}^B, \Psi^B \in \mathbb{R}^T,$$

reconstructed image $rec \in \mathbb{R}^L$ and original image $im \in \mathbb{R}^M$, M we let $$k_{opt}^B\big(im, rec, \Theta_1^B, \dots, \theta_{K_B}^B, \Psi^B\big) \in \{1, \dots, K_B\}$$

denote the smallest $k \in \{1, \dots, K_B\}$ with the property that $$\tilde{R}\big(im - F_{\Theta_{B,k}}^B(rec)\big) + \big(\mathcal{M}_{\Psi_B}^B(rec)\big)_k \leq$$
$$\tilde{R}\big(im - F_{\Theta_{B,l}}^B(rec)\big) + \big(\mathcal{M}_{\Psi_B}^B(rec)\big)_l \text{ for all } l \in \{1, \dots, K_B\}.$$

Since $\mathcal{M}$ models the true number of bits for the singalization of an intra mode, its gradient is either zero or undefined. Thus, $\mathcal{M}$ allone does not suffice to optimize the weights $\Psi_B$ via a gradient-descent based algorithm. Thus, we also invoke the cross entropy of an intra mode by transforming the function $$G_{\Psi_B}^B$$

into a probability distribution using the softmax-function. We recall the definition of the latter function. For $x \in \mathbb{R}^T$ let $x_i$ denote the i-th component of x. Then the softmax function $\sigma : \mathbb{R}^{K_B} \to (0,1)^{K_B}$ is defined as $$(\sigma(x))_k := \frac{e^{x_k}}{\sum_{l=1}^{K_B} e^{x_l}}.$$

For gradient updates, we will try to minimize the sum of the rate of the residue and the cross entropy of the mode $k_{opt}$ with respect to the latter probability distribution. Thus we define our loss function $\text{Loss}^B$ for the block B as $$\text{Loss}^B\big(im, rec, \Theta_1^B, \dots, \Theta_{k_B}^B, \Psi^B\big) := \tilde{R}\bigg(im - F_{\Theta_{k_{opt}^B}^B}^B(rec)\bigg) - \tag{5}$$
$$\log_2\bigg(\big(\sigma\big(G_{\Psi_B}^B(rec)\big)\big)_{k_{opt}^B}\bigg),$$

where $$k_{opt}^B = k_{opt}^B\big(im, rec, \Theta_1^B, \dots, \Theta_{K_B}^B, \Psi^B\big).$$

Given the loss function in (5), we determine the weights $$\Theta_1^B, \dots, \Theta_{K_B}^B$$

by a data driven optimization. Thus, if for a finite, large index set $\mathcal{J}_B$ we are given a set of training examples $$\mathrm{II}_{i \in \mathcal{J}_B}(rec_i, im_i)$$

of images $im_i$ on B and corresponding reconstructed images $rec_i$ on $B_{rec}$, we apply an optimization algorithm, for example based on the (stochastic) gradient descent method, to find weights $$\Theta_1^B, \dots, \Theta_{k_B}^B, \Psi^B \in \mathbb{R}^T$$

that minimize the expression $$\sum_{i \in \mathcal{J}_B} \text{Loss}^B\big(im_i, rec_i, \Theta_1^B, \dots, \Theta_{k_B}^B, \Psi^B\big). \tag{6}$$

1.3 Specification of the Functions $$F_\Theta^B \text{ and } G_\Theta^B$$

In this section, we define the form of the functions $$F_\Theta^B \text{ and } G_\Theta^B$$

more precisely. Again, recall that some define neural networks 80 and 84. Each of these functions consists of a sequence of compositions of functions which are either: 1) An affine transofrmation Aff or 2) A non-linear activation function Act.

By an affine transformation $\text{Aff}: \mathbb{R}^m \to \mathbb{R}^n$, we mean a map that is of the form $$Aff(x) = L(x) + b,$$

where $L: \mathbb{R}^m \to \mathbb{R}^n$ is a linear transformation, i.e. satisfies $$L(\lambda \cdot x_1 + x_2) = \lambda \cdot L(x_1) + L(x_2)$$

for all $\lambda \in \mathbb{R}$, $x_1, x_2 \in \mathbb{R}^m$, and where $b \in \mathbb{R}^n$. Each linear map $L: \mathbb{R}^m \to \mathbb{R}^n$ is completely determined by a matrix in $\mathbb{R}^{n \times m}$, i.e. corresponds uniquely to a vector $\Theta_L \in \mathbb{R}^{m \cdot n}$. Each affine function $\text{Aff}: \mathbb{R}^m \to \mathbb{R}^n$ is thus completely determined by $m \cdot n + n$ weights, i.e. by a vector $\Theta \in \mathbb{R}^{m \cdot n + n}$. For each $\Theta \in \mathbb{R}^{m \cdot n + n}$ we shall write $\text{Aff}_\Theta$ for the unique affine transformation that corresponds to $\Theta$ in the aforementioned way.

By a non-linear activation function Act: $\mathbb{R}^n \to \mathbb{R}^n$, we mean a function of the form $$(Act(x))_i = \rho(x_i).$$

Here, $(Act(x))_i$ denotes the i-th component of $Act(x)$ and $x_i$ denotes the i-th component of x. Finally, $\rho: \mathbb{R} \to \mathbb{R}$ my be of the form $$\rho(z) = \begin{cases} z, & \text{if } z \geq 0 \\ 0, & \text{if } z < 0. \end{cases} \quad (7)$$

or of the form $$\rho(z) = (z) = \begin{cases} z, & \text{if } z > 0 \\ e^z - 1, & \text{otherwise.} \end{cases}, \quad (8)$$

although these examples shall not be interpreted as limiting embodiments of the present application to these explicit examples. Other formulae may be used as well such as $\rho(z) = \log(1 + e^z)$ or any other non-linear function. $p: \mathbb{R} \to \mathbb{R}$ may alternatively be a piecewise smooth function, for example.

Our function $$F_\Theta^B$$

now looks as follows. We assume that for a fixed $k \in \mathbb{N}$ we are given $m_1, \ldots, m_k \in \mathbb{N}$ and $n_1, \ldots, n_k \in \mathbb{N}$ with $m_1 = L$, $n_k = M$, such that $$T = (m_1 \cdot n_1 + n_1) + (m_2 \cdot n_2 + n_2) + \ldots + (m_k \cdot n_k + n_k).$$

Here, $T \in \mathbb{N}$, $L \in \mathbb{N}$ and $M \in \mathbb{N}$ are as in (1). Then, for $\Theta_1 \in \mathbb{R}^{m_1 \cdot n_1 + n_1}, \ldots, \Theta_k \in \mathbb{R}^{m_k \cdot n_k + n_k}$ with $\Theta = (\Theta_1, \ldots, \Theta_k) \in \mathbb{R}^T$, we define $$F_\Theta^B := Aff_{\Theta_k} \circ \rho \circ Aff_{\Theta_{k-1}} \circ \rho \circ Aff_{\Theta_{k-2}} \circ \ldots \circ \rho \circ Aff_{\Theta_1}.$$

$$F_\Theta^B$$

would, thus, describe a neural network 80$_j$ parametrized using paramters $\Theta$. It would be a sequence of linear functions $\text{Aff}_{\Theta_j}$ and non-linear functions $\rho$, which, in the present example, are applied alternatingly in the sequence, wherein the parameters $\Theta$ comprise the linear function weights in $\text{Aff}_{\Theta_j}$. In the sequence of linear functions $\text{Aff}_{\Theta_j}$ and non-linear functions $\rho$, the pairs of a linear function $\text{Aff}_{\Theta_j}$ followed by non-linear function $\rho$ would represent a neuron layer, for example, such as the j-th layer, with the number of predecessor nodes preceding this neuron layer j in feed-forward direction of the neural network being determined by dimension m of $\text{Aff}_{\Theta_j}$, the number of columns of $\text{Aff}_{\Theta_j}$, and the number of neurons of the neuron layer j itself being determined by dimension n of $\text{Aff}_{\Theta_j}$, the number of its rows. Each row of $\text{Aff}_{\Theta_j}$ incorpartes the weights controlling as to how strong a signal respectively activation of each of the m predecessor neurons is forwarded to the respective neuron of the neuron layer j which corresponds to the respective row. $\rho$ controls for each neuron of neuron layer j the non-linear mapping of its linear combination of forwarded predecessor neuron activations onto its own activation. In the above example, there are k such neuron layers. The number of neurons per layer may vary. The number of nuron layers k may vary among the various neural networks 80$_j$, i.e. for different j. Note, that the non-linear function might vary per neurion layer or even per neuron or at some other units.

Similarly, our function $$G_\Psi^B$$

looks as follows. We assume that for a fixed $k' \in \mathbb{N}$ we are given $m_{1'}, \ldots, m_{k'} \in \mathbb{N}$ and $n_{1'}, \ldots, n_{k'} \in \mathbb{N}$ with $m_{1'} = L$, $n_k = K_B$, such that $$T = (m_1' \cdot n_1' + n_1') + (m_2' \cdot n_2' + \cdot n_2') + \ldots + (m_{k'}' \cdot n_{k'}' + n_{k'}').$$

Here, $T \in \mathbb{N}$, $L \in \mathbb{N}$ and $K_B \in \mathbb{N}$ are as in (3). Then, for $\Psi_1 \in \mathbb{R}^{m_{1'} \cdot n_{1'} + n_{1'}}, \ldots, \Psi_{k'} \in \mathbb{R}^{m_{k'} \cdot n_{k'} + n_{k'}}$ with $\Psi = (\Psi_1, \ldots, \Psi_{k'}) \in \mathbb{R}^T$, we define $$G_\Psi^B := Aff_{\Psi_{k'}} \circ \rho \circ Aff_{\Psi_{k'-1}} \circ \rho \circ Aff_{\Psi_{k'-2}} \circ \ldots \circ \rho \circ Aff_{\Psi_1}.$$

$$G_\Psi^B$$

would, thus, describe a neural network 84 parametrized using paramters $\Psi$. It would be a sequence of linear functions $Aff_{\Psi_j}$ and non-linear functions $\rho$, just as it has been described above with respect to the neuron layers concerning the prediction signal computation. The number of neuron layers k' of neural network 84 may differ from one or more of the number of neuron layers k of neural networks 80$_i$.

1.4 Training That Takes Existing Predictions Into Account

We extended the algorithm of the previous section so that we can train predictions that complement already existing intra predictions.

Namely, let $$\mathcal{F}_{fix}^B := \left\{ F_1^B, \ldots, F_{K_B, fix}^B \right\}$$

be a set of fixed intra prediction functions that are already available. For example, $$\mathcal{F}_{fix}^B$$

can consist of the DC- or Planar-prediction of HEVC and angular predictions defined according to HEVC; all those predictions may also include a preliminary smoothing of the reconstructed samples. Moreover, we assume that we are given a function $$\mathcal{L}_{fix}: \mathbb{R}^M \times \mathbb{R}^L \times \{1, \ldots, \tilde{K}_B\} \to \mathbb{R}$$

such that $\mathcal{L}_{fix}(im, rec, k)$ models the loss of the k-th intra predicont function $$F_{k, fix}^B$$

applied to rec given the original image im.

Then we extend the loss function from (5) to the loss function $$Loss_{\mathcal{F}_{fix}^B}^B \left( im, rec, \Theta_1^B, \ldots, \Theta_{k_B}^B, \Psi^B \right) := \quad (9)$$

$$\min \left( Loss^B \left( im, rec, \Theta_1^B, \ldots, \Theta_{k_B}^B, \Psi^B \right), \min_{k \in \{1, \ldots, K_B\}} \mathcal{L}_{fix}(im, rec, k) \right).$$

Keeping the notations from the end of the previous section, we determine weights $$\Theta_1^B, \ldots, \Theta_{k_B}^B, \Psi^B \in \mathbb{R}^T$$

by minimizing $$\sum_{i \in \mathcal{J}_B} Loss_{\mathcal{F}_{fix}^B}^B \left( im_i, rec_i, \Theta_1^B, \ldots, \Theta_{k_B}^B, \Psi^B \right) \quad (10)$$

on a large set of training examples.

For that purpose, we typically firstly find the weights by optimizing (6) and then initialize with those weights to find the weights that optimize (10).

1.5 Joint Training of Predictions for Several Block Shapes

In this section we described how, in the training of our predictions, one may take into account that in a typical video coding standard it is usually possible to split a block into smaller subblocks in various ways and to perform an intra prediction on the smaller subblocks.

Namely, assume that for some $S \in \mathbb{N}$ we are given a set $$\mathcal{BL} = \{B_1, \ldots, B_S\}$$

of admissible blocks $B_i \subset \mathbb{Z}^2$ together with a set of areas $$\mathcal{BL}^{rec} = \{B_1^{rec}, \ldots, B_S^{rec}\}$$

such that each $$B_i^{rec} \subset \mathbb{Z}^2$$

is a neighborhood of $B_i$. Typically, $$B_i^{rec}$$

is a union of two rectangles left and above $B_i$.

We assume that there exists a block $B_{max} \in \mathcal{BL}$ such that $B_i \subseteq B_{max}$ for each $i \in \{1, \ldots, S\}$. Let $\mathcal{P}(\mathcal{BL})$ be the power set of $\mathcal{BL}$. Then for $B \in \mathcal{BL}$ we assume that a set $$\mathcal{BL}(B) \subseteq \mathcal{P}(\mathcal{BL})$$

is given such that for each $Y = \{B_{i_1}, \ldots, B_{i_k}\} \in \mathcal{BL}(B)$ the block B can be written as a disjoint union $$B = \amalg_{B_i \in Y} B_i.$$

For a given color component, let im be an image on $B_{max}$, which, by restriction, we regard as an image $im|_{B_i}$ on $B_i$ for each $B_i \in \mathcal{BL}$. Moreover, assume that there exists a reconstructed image rec on $$\bigcup_{i=1}^{S} B_i^{rec},$$

which, by restriction, we regard as an image $$rec|_{B_i^{rec}}$$

on $$B_i^{rec}$$

for each $$B_i^{rec} \in \mathcal{BL}^{rec}.$$

Keeping the notations of section 1.2, for each $B \in \mathcal{BL}$ we seek $$\Theta_1^B, \ldots, \Theta_{K_B}^B \in \mathbb{R}^T$$

as the set of weights for $K_B$ intra prediction-functions $$F_{\Theta_k}^B$$

and we seek $\Psi^B \in \mathbb{R}^T$ as weights for the mode prediction function $G^B$. We determine these weights for all $B \in \mathcal{BL}$ jointly as follows. For $B \in \mathcal{BL}$ and given sets of weights $$\{\Theta_k^{B\prime}\},$$

$B' \in \mathcal{BL}$, $B' \subseteq B$, $1 \leq k \leq K_{B'}$, we put $$\Theta^B := \amalg_{B\prime \in \mathcal{BL}: B\prime \subseteq B} \amalg_{k=1}^{K_{B\prime}} \Theta_k^{B\prime}, \quad \Psi^B := \amalg_{B\prime \in \mathcal{BL}: B\prime \subseteq B} \Psi^{B\prime}.$$

Moreover, for $B' \subset B$ we define $\Theta^B|_{B\prime} \subset \Theta^B$ as $$\Theta^B|_{B\prime} := \amalg_{B\prime\prime \in \mathcal{BL}: B\prime\prime \subseteq B\prime} \amalg_{k=1}^{K_{B\prime\prime}} \Theta_k^{B\prime\prime}, \quad \Psi^B|_{B\prime} := \amalg_{B\prime\prime \in \mathcal{BL}: B\prime\prime \subseteq B\prime} \Psi^{B\prime\prime}$$

As in section 1.4, we assume that for each $B \in \mathcal{BL}$ a possibly empty set $\mathcal{F}_{fix}^B$ of intra prediction functions is available. We let $$\mathcal{F}_{fix} := \amalg_{B \in \mathcal{B}} \mathcal{F}_{fix}^B.$$

Then we define a loss-function $$Loss_{\mathcal{F}_{fix}}^{B,total}$$

as follows. We have an ordering $\leq$ on the set $\mathcal{BL}$ via the inclusion of sets. Let $$\mathcal{BL}^{min} \subseteq \mathcal{BL}$$

be the set of all minimal elements in $\mathcal{BL}$. For $B \in \mathcal{BL}^{min}$ we put $$Loss_{\mathcal{F}_{fix}}^B \left( im, rec, \Theta^B, \Psi^B \right) := Loss_{\mathcal{F}_{fix}^B}^B \left( im, rec, \theta^B, \Psi^B \right),$$

where the latter function is as in (9).

Next, let $B \in \mathcal{BL}$ and assume that $Loss^{B,total}$ is already defined for all $B' \in \mathcal{BL}$ with $B' \subseteq B$.

Then we define $$Loss_{\mathcal{F}_{fix}}^{B,total} \left( im, rec, \Theta^B, \Psi^B \right) := \min \Bigg( Loss_{\mathcal{F}_{fix}^B}^B \left( im, rec, \Theta_1^B, \ldots, \Theta_{K_B}^B, \Psi_{K_B} \right),$$
$$\min_{Y \in \mathcal{BL}(B)} \sum_{B\prime \in Y} Loss_{\mathcal{F}_{fix}}^{B\prime,total} \left( im, rec, \Theta^B|_{Bm\prime}, \Psi^B|_{B\prime} \right) \Bigg).$$

Finally, given a fixed set of training examples $$\amalg_{i \in \mathcal{J}_B} (rec_i, im_i)$$

of images $im_i$ on $B_{max}$, we determine $\Theta^B{}_{max}, \Psi^B{}_{max}$ by minimizing or at least making small the expression $$\sum_{i \in \mathcal{J}} Loss_{\mathcal{F}_{fix}}^{B_{max},total} (im_i, rec_i, \Theta^{B_{max}}, \Psi^{B_{max}}).$$

We typically initialize the weights $$\Theta_k^B,$$

$\Psi^B$ by firstly minimizing (9) for each $B \in \mathcal{BL}$ individually.

2 Integration of Trained Neural Networks into a Video Codec

We consider a hybrid video coding standard in which for a given color component the content of a video signal on a given block $B \subseteq \mathbb{Z}^2$ is to be generated by a decoder. Let M be the number of pixels of B. Moreover, let $B_{rec} \subseteq \mathbb{Z}^2$ be a fixed neighbourhood of B such that the decoder has at its disposal a reconstructed image rec on $B_{rec}$. Let L be the number of pixels of $B_{rec}$. Then we regard rec as an element of $\mathbb{R}^L$. We assume that the codec operates by predictive coding on the current block B 10. Then we claim copyright for the following steps that a decoder can perform in order to generate a prediction signal pred on B, which we regard as an element of $\mathbb{R}^M$:

1. The decoder has at its disposal fixed numbers $K_B$, $T \in \mathbb{N}$, functions $F^B: \mathbb{R}^L \times \mathbb{R}^T \to \mathbb{R}^M$, namely 80₁ . . .

$80_{(CB-1)}$ and $G_B : \mathbb{R}^L \times \mathbb{R}^T \to \mathbb{R}^{K_B}$, namely 84, as well as weights $\Theta_1, \ldots, \Theta_{K_B} \in \mathbb{R}^T$ and a weight $\Psi \in \mathbb{R}^T$, where the latter weights are determined in advance by a training algorithm that was described in the previous section.

2. The decoder reconstructs from the bitstream a flag that is part of side information 70 and indicates whether exactly one of the following options is true: [label=)]
   (i) One of the predictions $$F_{\Theta_{B,1}}^B, \cdots, F_{\Theta_{B,K_B}}^B$$

is to be used, i.e. a mode out of set 72
   (ii) None of the predictions $$F_{\Theta_{B,1}}^B, \cdots, F_{\Theta_{B,K_B}}^B$$

is to be used, i.e. one out of 74, for instance
   Here, the functions $$F_{\Theta_{B,K_B}}^B$$

are as in (2).

3. If Option Two in step 2 is true, the decoder proceeds for the given block 10 as in the underlying hybrid video coding standard.

4. If Option One in step 2 is true, the decoder applies the function $$G_\Psi^B,$$

i.e. 84, defined according to (4), to the reconstructed image rec. Let $X := (x_1, \ldots, x_{K_B}) \in \mathbb{R}^{K_B}$ be defined as $$X := G_\Psi^B(rec).$$

Then the standard is changed in a way such that the decoder defines a number $m \in \{1, \ldots, K_B\}$ by exactly one of the following tow options:
   (i) The decoder defines a probability distribution $$P_{G_\Psi^B(rec)}$$

on the set $\{1, \ldots, K_B\}$ by $$P_{G_\Psi^B(rec)}(i) := \frac{e^{x_i}}{\sum_{j=1}^{K_B} e^{x_j}}.$$

and uses the latter probability distribution $$P_{G_{Psi}^B(rec)}$$

to parse an index $k \in \{1, \ldots, K_B\}$ that is also part of side information 70 via the entropy coding engine used in the underlying standard from the datastream 12 and defines $m := k$.
   (ii) The decoder defines a permutation $$\sigma : \{1, \ldots, K_B\} \to \{1, \ldots, K_B\}$$

inductively by putting $$\sigma(1) := k_{max}^1,$$

where $$k_{max}^1 \in \{1, \ldots, K_B\}$$

is the minimal number with $$x_{k_{max}^1} \geq x_k$$

for all $k \in \{1, \ldots K_B\}$ and by putting $$\sigma(l+1) := k_{max}^{l+1},$$

where $$k_{max}^{l+1} \in \{1, \ldots, K_B\} \backslash \{\sigma(1), \ldots, \sigma(l)\}$$

is the minimal number such that one has $$x_{k_{max}^{l+1}} \geq x_k$$

for all $k \in \{1, \ldots, K_B\} \backslash \{\sigma(1), \ldots, \sigma(l)\}$.
   Then the decoder reconstructs from the bitstream 12 a unique index $i \in \{1, \ldots, K_B\}$ that Is also part of datastream 12 and puts $m := \sigma(i)$.
   In the code design to parse the latter index i, the number of bits needed to signal an index $i_1 \in \{1, \ldots, K_B\}$ has to be less than or equal to the number of bits to signal an index $i_2 \in \{1, \ldots, K_B\}$ if $\sigma(i_1) \leq \sigma(i_2)$ and if all involved underlying probabilities used by the entropy coding engine are set to equal probability.
      5. If Option One in step 2 is true and if the decoder has determined the index m according to the previous step 4, the decoder generates 71 the prediction signal $pred \in \mathbb{R}_M$ as $$pred = F_{\Theta_m}^B(rec),$$

i.e. using the selected neural network $80_m$. Then the decoder proceeds as in the underlying hybrid video coding standard using pred as prediction signal.

The integration of intra prediction functions whose design is based on a data driven learning approach into an existing hybrid video codec. The description had two main parts. In the first part, we described a concrete algorithm for an offline training of intra prediction functions. In the second part, we described how a video decoder may use the latter prediction functions in order to generate a prediction signal for a given block.

Thus, what has been described above in sections 1.1 to 2, is, inter alia, an apparatus for block-wise decoding a picture 10 from a datastream 12. The apparatus 54 supports a plurality of intra-prediction modes comprising, at least, a set 72 of intra-prediction modes according to which the intra-prediction signal for a current block 18 of the picture 10 is determined by applying a first set 60 of neighboring samples of the current block 18 onto a neural network 80$_i$. The apparatus 54 is configured to select 68 for the current block 18 one intra-prediction mode out of the plurality 66 of intra-prediction modes and predicts 71 the current block 18 using the one intra-prediction mode, namely using the corresponding neural network 80$_m$ having been selected. Although the decoder presented in section 2, had intra-prediction modes 74 within the plurality 66 of intra-prediction modes supported in addition to the neural network-based ones in set 72, this has been merely an example and needs not to be the case. Further, the above description in sections 1 and 2 may be varied in that decoder 54 does not use, and does not comprise, the further neural network 84. With respect to the optimization described above, this means that the second adder in the inner quality presented in section 1.2 for finding-out $$k_{opt}^B$$

would not have to be a concatenation of a function $M^B$ applied onto any probability value neural network function $G^B$. The optimization algorithm of what, rather, determines suitable parameters for the neural networks 80$_i$ in a manner so that the frequency of selection would appropriately follow a code rate indication of $M^B$. For instance, the decoder 54 could decode from datastream 12 an index for block 18 using a variable length code, the code length of which are indicated in $M^B$, and the decoder 54 would perform the selection 68 based on this index. The index would be part of the side information 70.

A further alternative to the description brought forward above in section 2 is that the decoder 54 may alternatively derive a ranking among the set 72 of neural network-based intra-prediction modes depending on a first portion of the datastream which relates to a neighborhood of the current block 18 in order to obtain an ordered list of intra-prediction modes with selecting the intra-prediction mode finally to be used out of the ordered list of intra-prediction modes depending on a second portion of the datastream other than the first portion. The "first portion" may, for instance, relate to a coding parameter or prediction parameter related to one or more block neighboring current block 18. The "second portion" may then be an index, for instance, pointing into, or being an index of, the neural network-based intra-prediction mode set 72. When construed in alignment with above-outlined section 2, the decoder 54 comprises the further neural network 84 which determines, for each intra-prediction mode of the set 72 of intra-prediction modes, a probability value by applying set 86 of neighboring samples thereonto and ordering these probability values in order to determine a rank for each intra-prediction mode of set 72, thereby obtaining an ordered list of intra-prediction modes. An index in the datastream 12 as part of side information 70 is then used as an index into the ordered list. Here, this index may be coded using variable length code for which $M^B$ indicates the code length. And as explained above in section 2, in item 4i, according to a further alternative embodiment, decoder 54 may use the just-mentioned probability values determined by the further neural network 84 for each neural network-based intra-prediction mode of set 72 so as to efficiently perform entropy coding of the index into set 72. In particular, the symbol alphabet of this index which is part of the side information 70 and used as an index into set 72, would comprise a symbol or value for each of the modes within set 72, and the probability values provided by neural network 84 would, in case of neural network 84 design according to the above description, provide probability values which would lead to efficient entropy coding in that these probability values closely represent the actual symbol statistics. For this entropy coding, arithmetic coding could be used, for instance, or probability interval partitioning entropy (PIPE) coding.

Favorably, no additional information is necessary for any of the intra-prediction modes of set 72. Each neural network 80$_i$, once advantageously parametrized for encoder and decoder in accordance with, for example, the above description in sections 1 and 2, derives the prediction signal for the current block 18 without any additional guidance in the datastream. As already denoted above, the existence of other intra-prediction modes besides the neural network-based ones in set 72 is optional. They have been indicated above by set 74. In this regard, it should be noted that one possible way of selecting set 60, i.e. the set of neighboring samples forming the input for the intra-prediction 71, may be selected such that this set 60 is the same for the intra-prediction modes of set 74, i.e. the heuristic ones, with set 60 for the neural network-based intra-prediction modes being larger in terms of the number of neighboring samples included in set 60 and influencing the intra-prediction 71. In other words, the cardinality of set 60 may be larger for neural network-based intra-prediction modes 72 compared to the other modes of set 74. For instance, set 60 of any intra-prediction mode of set 74 may merely comprise neighboring samples along a one-dimensional line extending alongside to sides of block 18 such as the left hand one and the upper one. Set 60 of the neural network-based intra-prediction modes may cover an L-shaped portion extending alongside the just-mentioned sides of block 18 but being wider than just one-sample wide as set 60 for the intra-prediction modes of set 74. In this manner, neural network-based intra-prediction modes may result into a better intra-prediction with a correspondingly lower prediction residual.

As described above in section 2, the side information 70 conveyed in the datastream 12 to an intra-predicted block 18 may comprise a fleck which generally indicates whether the selected intra-prediction mode for block 18 is member of set 72 or member of set 74. This fleck is, however, merely optional with side information 70 indicating, for instance, an index into a whole plurality 66 of intra-prediction modes including both sets 72 and 74.

Figure 7A:
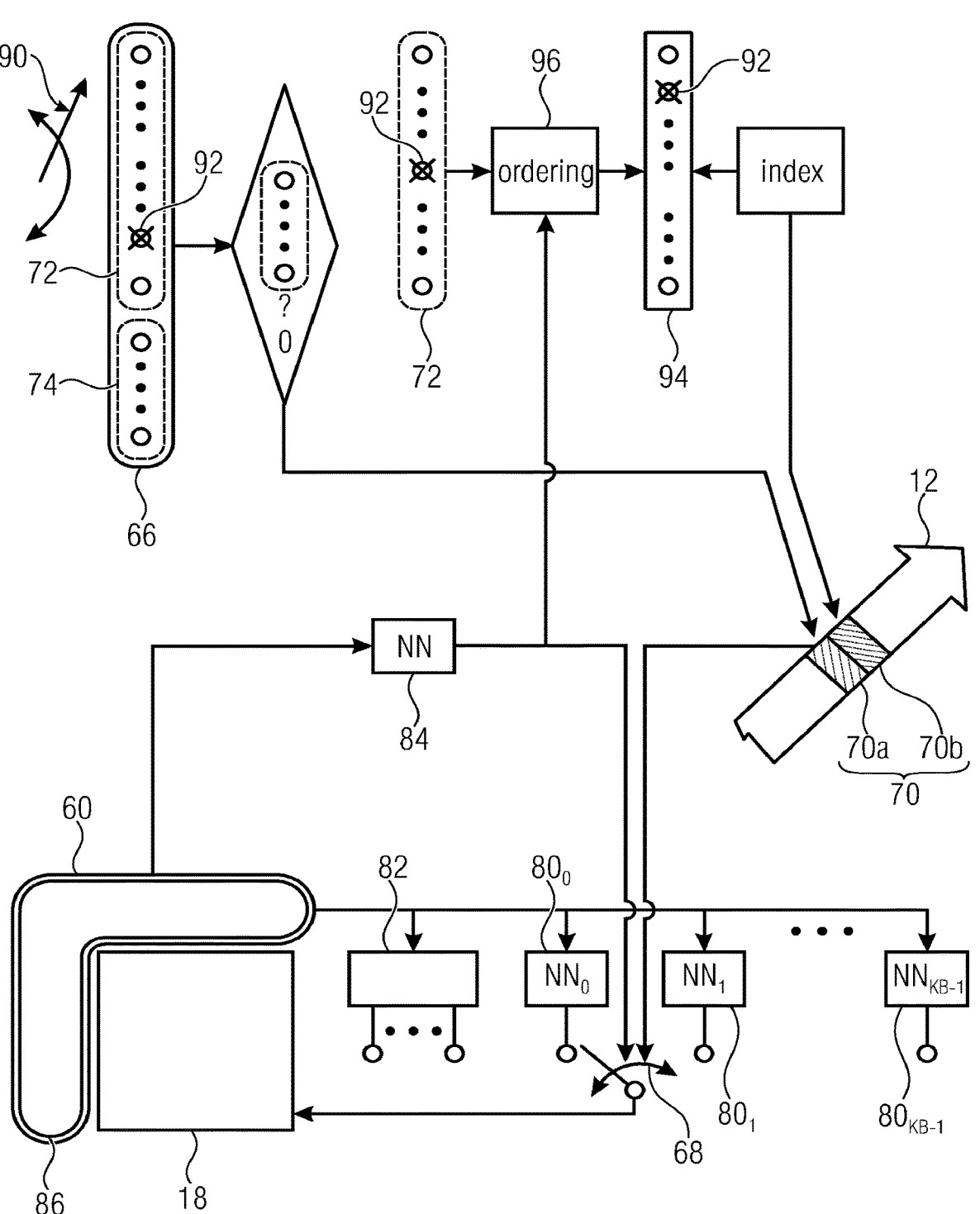
FIG. 7*a* shows a schematic diagram illustrating the mode of operation of an encoder and a decoder in accordance with an embodiment supporting neural network-based intra-prediction modes and a neural network-based ordering of these modes with transmitting within the datastream an index into an ordered list of neural network-based intra-prediction modes along with a fleck indicating whether the intra-prediction mode to be used is member of the set of neural network-based intra-prediction modes or not. It is needless to say the index may be coded using variable length coding so as to take advantage of the different frequency of being determined by determination 90.

The just-discussed alternatives are, in the following, briefly discussed with respect to the FIGS. 7a to 7d. The Figs. define both, decoder and encoder concurrently, namely in terms of their functionality with respect to an intra-predicted block 18. The differences between the encoder mode of operation and the decoder mode of operation with respect to an intra-coded block 18 is, on the one hand, the fact that the encoder performs all or at least some of the intra-prediction modes 66 available so as to determine at 90 a best one in terms of, for instance, some cost function minimizing sense, and that the encoder forms data stream 12, i.e., codes date there into, while the decoder derives the data therefrom by decoding and reading, respectively. FIG. 7a shows the mode of operation for the above-outlined alternative according to which a flag 70a within the side information 70 for block 18 indicates whether the intra-prediction mode determined to be the best mode for block 18 by the encoder in step 90, is within set 72, i.e., is neural network based intra-prediction mode, or within set 74, i.e., one of the non-neural network based intra-prediction modes. The encoder inserts flag 70a into data stream 12 accordingly, while the decoder retrieves it therefrom. FIG. 7a assumes that the determined intra-prediction mode 92 is within set 72. The separate neural network 84 then determines a probability value for each neural network based intra-prediction mode of set 72 and using these probability values set 72 or, to be more precise, the neural network based intra-prediction modes therein are ordered according to their probability values such as in descending order of their probability values, thereby resulting into an ordered list 94 of intra-prediction modes. An index 70b being part of the side information 70 is then coded by the encoder into data stream 12 and decoded therefrom by the decoder. The decoder, accordingly, is able to determine which set of sets 72 and 74. The intra-prediction mode to be used for block 18 is located in, and to perform the ordering 96 of set 72 in case of the intra-prediction mode to be used being located in set 72. It might be that an index is also transmitted in data stream 12 in case of the determined intra-prediction mode being located in set 74. Thus, the decoder is able to generate the prediction signal for block 18 using the determined intra-prediction mode by controlling the selection 68 accordingly.

Figure 7B:
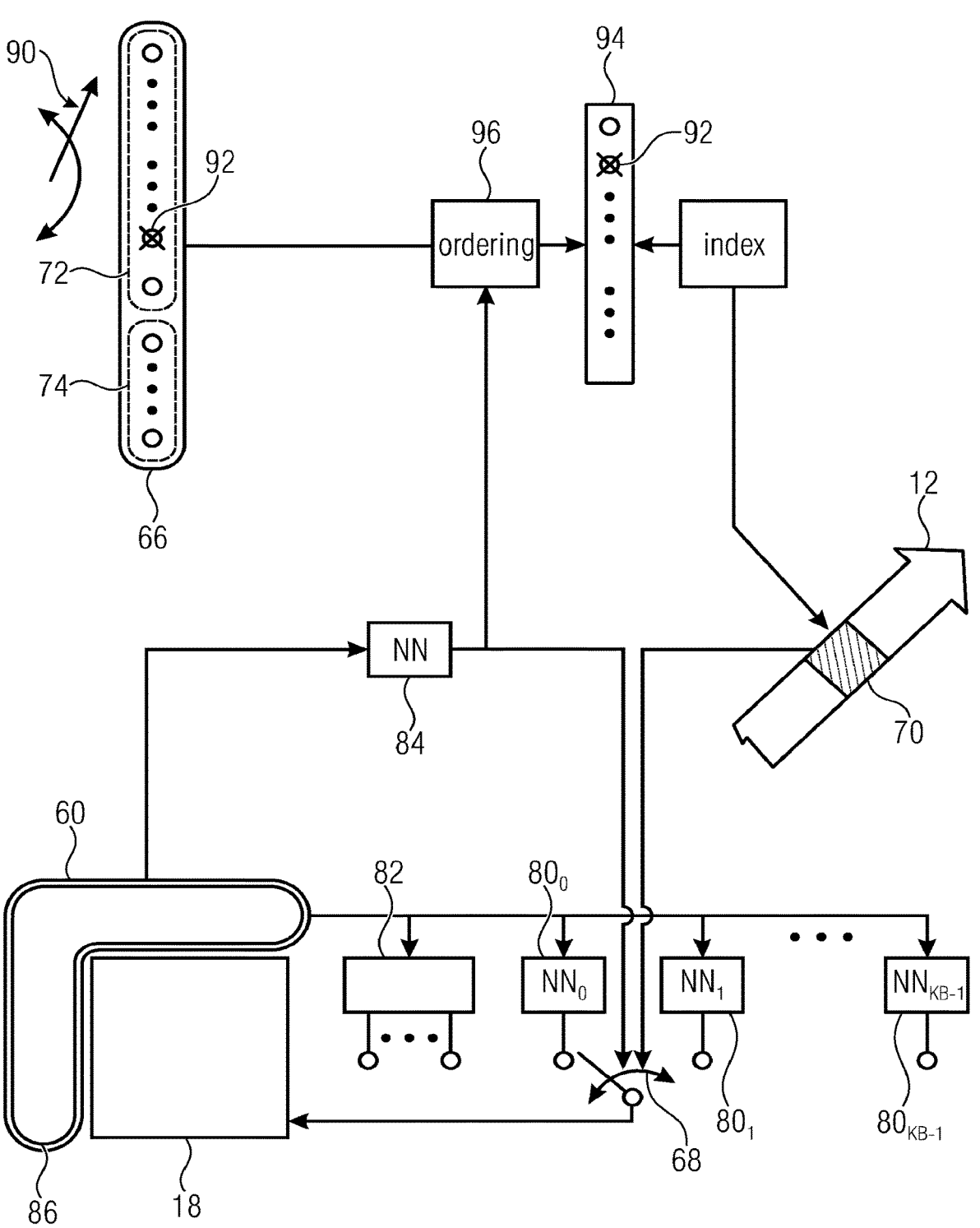
FIG. 7*b* shows a schematic diagram differing from FIG. 7*a* in that the fleck signalization is not used.
Figure 7C:
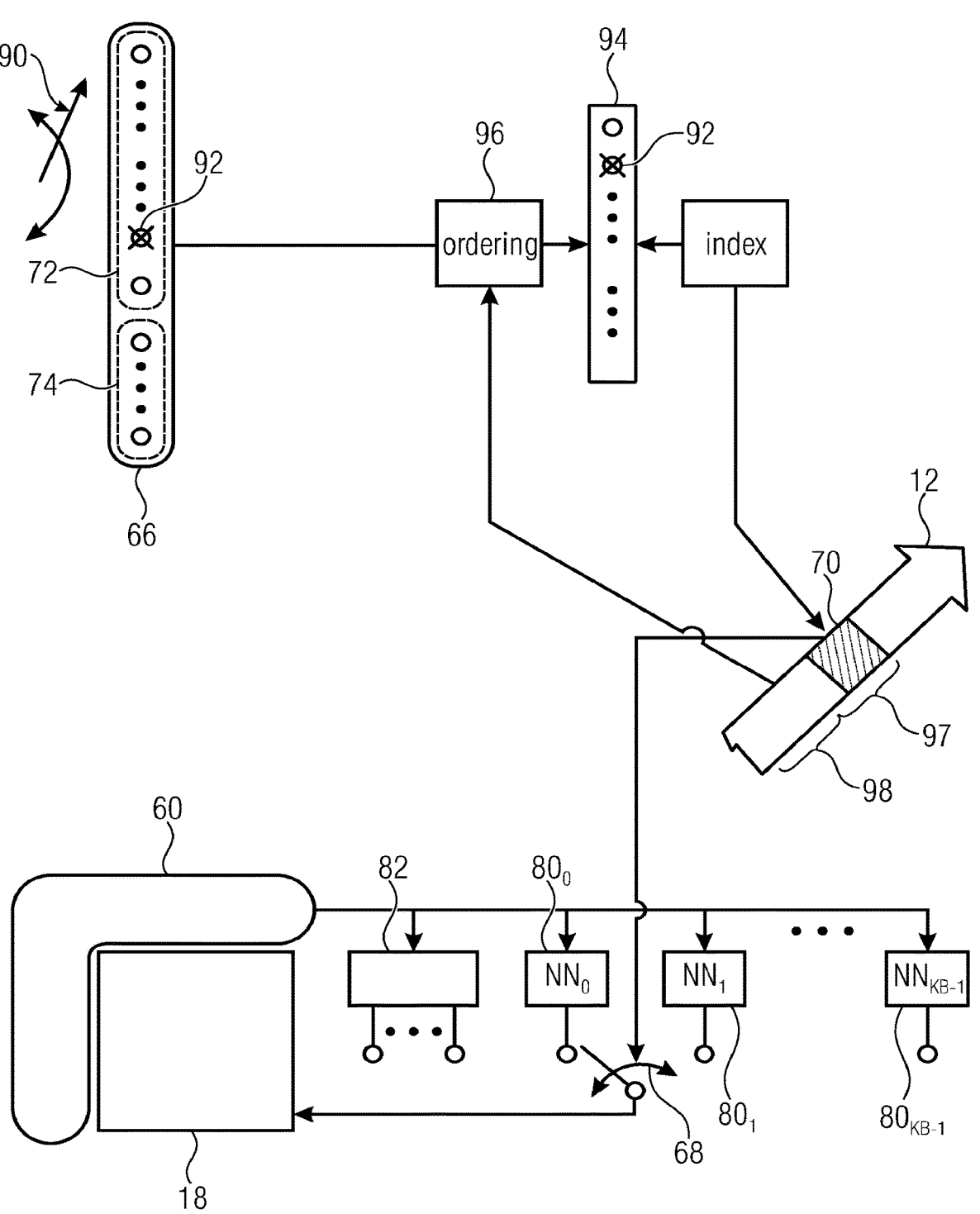
FIG. 7c shows a schematic diagram differing from 7b in that the mode ordering is not controlled using a neural network.

FIG. 7b shows an alternative according to which the flag 70a is not present in data stream 12. Instead, the ordered list 94 would not only comprise the intra-prediction modes of set 72, but also intra-prediction modes of set 74. The index within side information 70 would be an index into this greater ordered list and indicate the determined intra-prediction mode, i.e., the one determined be optimization 90. In case of neural network 84 providing a probability value for the neural network based intra-prediction mode within 72 only, the ranking between intra-prediction modes of set 72 relative to the intra-prediction modes of set 74 may be determined by other means such as inevitably arranging the neural network based intra-prediction modes of set 72 to precede the modes of set 74 in the order list 94 or to arrange them alternatingly relative to each other. That is, the decoder is able to derive the index from data stream 12, use the index 70 as in index into the order list 94 with deriving the order list 94 from the plurality of intra-prediction modes 66 using the probability values output by neural network 84. FIG. 7c shows a further variant. FIG. 7c show a case of not using flag 70a, but the flag could be used alternatively. The issue which FIG. 7c is directed pertains to the possibility that neither encoder nor decoder uses neural network 84. Rather, the ordering 96 is derived by other means such as coding parameters conveyed within data stream 12 with respect to one or more neighboring blocks 18, i.e., portions 98 of a data stream 12 which pertains to such one or more neighboring blocks.

Figure 7D:
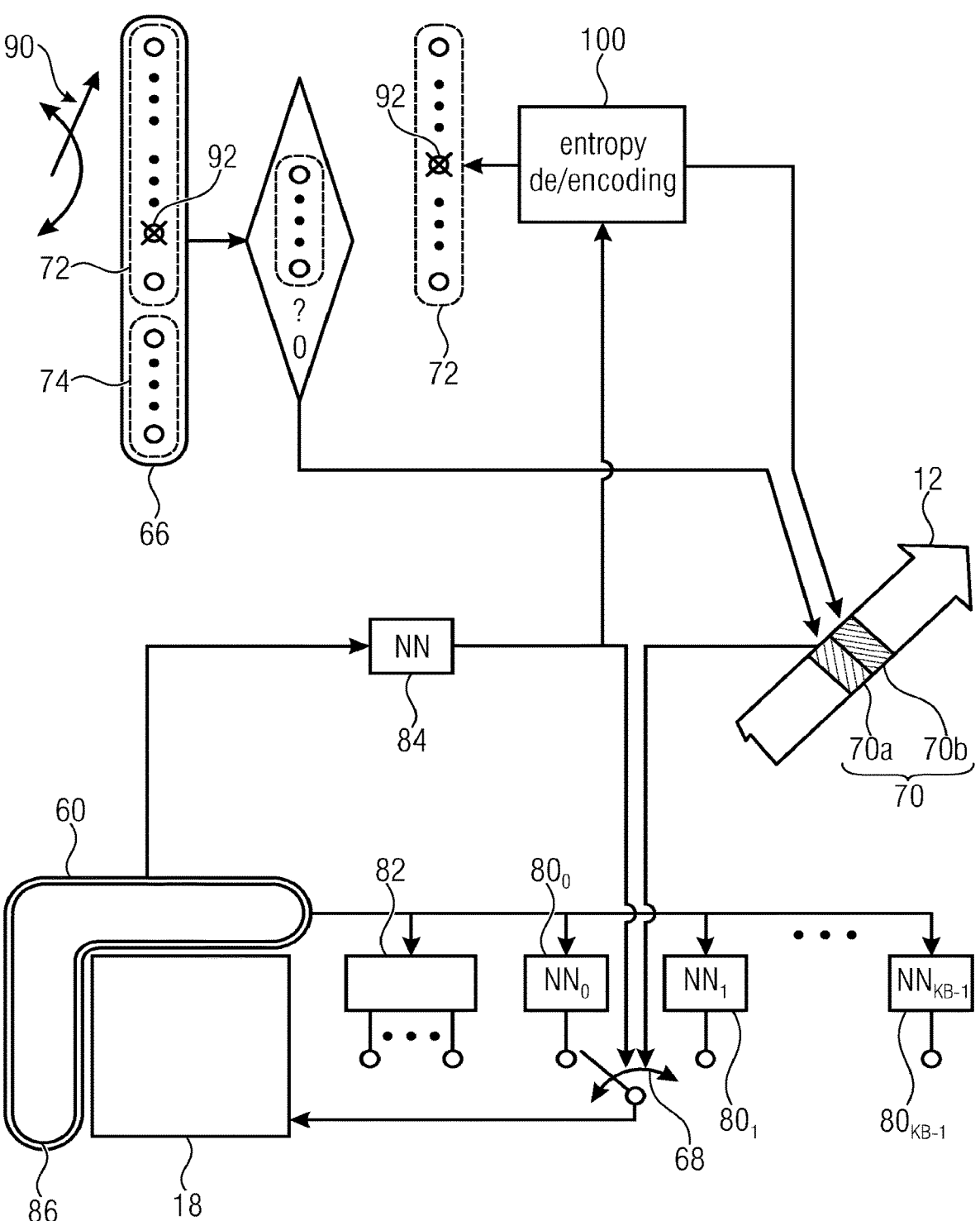
FIG. 7d shows a schematic diagram differing from 7a in that the neural network assistance in mode signalization is used for controlling the probability distribution estimation in entropy en/decoding rather than for mode ordering.

FIG. 7d shows a further variant of FIG. 7a, namely the one according to which the index 70b is coded using entropy coding and decoded from data stream 12 using entropy decoding, commonly denoted using reference sign 100. The sample statistics or the probability distribution used for the entropy coding 100 is controlled by the probability values output by neural network 84 as explained above, this renders the entropy coding of index 70b very efficient.

For all embodiments 7a to 7d it is true that set 74 modes may not be present. Accordingly, the respective module 82 may be missing and flag 70a would be unnecessary anyway.

Figure 8:
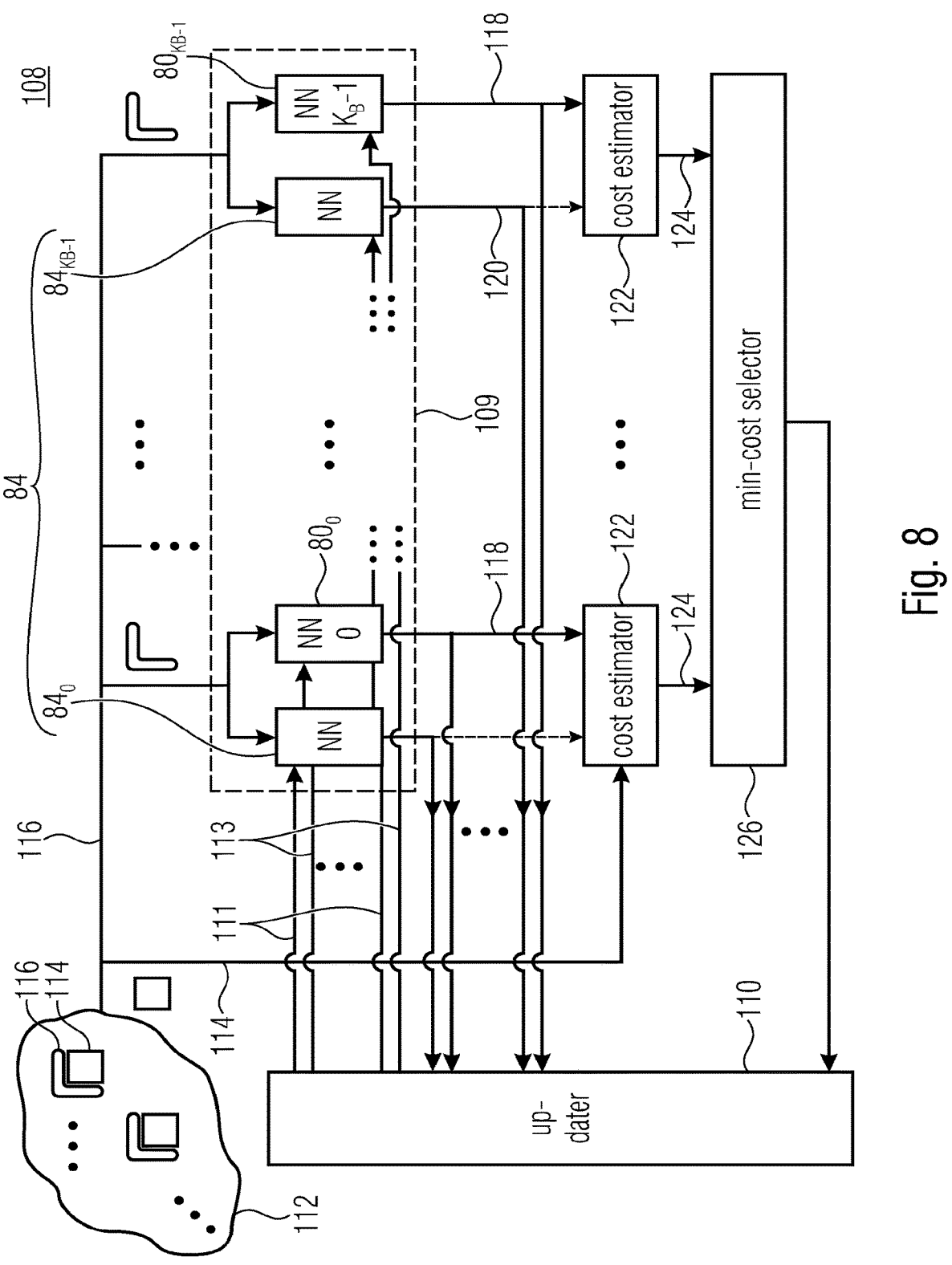
FIG. 8 shows an apparatus for designing a set of neural network-based intra-prediction modes in accordance with an embodiment.

Further, although not shown in any Fig., it is clear that the mode selection 68 at the encoder and decoder could be synchronized to each other even without any explicit signaling 70, i.e., without spending any side information. Rather, the selection could be derived from other means such as by taking inevitably the first one of the ordered list 94, or by deriving the index into the order list 94 on the basis of coding parameters relating to one or more neighboring blocks. FIG. 8 shows an apparatus for designing the set of intra-prediction modes of set 72 to be used for the block-based picture coding. The apparatus 108 comprises a parameterizable network 109 which inherits or comprises parameterizable versions of neural networks $80_0$ to $80_{KB-1}$ as well as neural network 84. Here, in FIG. 8, depicted as individual units, i.e., neural network $84_0$ for providing the probability value for neural network based intra-prediction mode 0 to neural network $84_{KB-1}$ for providing the probability value associated with the neural network based intra-prediction mode $K_{B-1}$. The parameters 111 for parametrizing neural networks 84 and the parameters 113 for parametrizing neural networks $80_0$ to $80_{KB-1}$ are input or applied to respective parameter inputs of these neural networks by an updater 110. Apparatus 108 has access to a reservoir or a plurality of picture test blocks 114 along with corresponding neighboring samples sets 116. Pairs of these blocks 114 and their associated neighboring sample sets 116 are sequentially used by apparatus 108. In particular, a current picture test block 114 is applied to parameterizable neural network 109 so that neural networks 80 provide a prediction signal 118 for each neural network based intra-prediction mode of set 72, and each neural network 80 provides a probability value for each of these modes. To this end, these neural networks use their current parameters 111 and 113.

In the above description rec has been used to denote the picture test block 114, and $$F_{\Theta_B}^B(rec)$$

is the prediction residual 118 for mode B and the probability value is $$G_{\Psi_B}^B(rec)$$

is the probability value 120. For each mode $0 \ldots K_{b-1}$, there is a cost estimator 122 comprised by apparatus 108 which computes a cost estimate for the respective mode on the basis of the prediction signal 118 obtained for the respective mode. In the above example, cost estimators 122 computed the cost estimates as indicated on the left and right hand sides of the inequality in section 1.2. That is, here, the cost estimators 122 also used, for each mode, the corresponding probability value 120. This needs not, however, to be case as already discussed above. The cost estimate, however, is in any case a sum of two addends, one of which is an estimate of the coding cost for the prediction residual indicated as the term with $\tilde{R}$ in the above inequality, and another addend estimating the coding costs for indicating the mode. In order to compute the estimate for the coding cost related to the prediction residual, the cost estimators 122 also obtain the original content of the current picture test block 114. The neural networks 80 and 84 had at their inputs applied thereto the corresponding neighboring sample sets 116. The cost estimate 124 as output by cost estimators 122 is received by a minimum cost selector 126 which determines the mode minimizing or having minimum cost estimate associated therewith. In the above mathematical notation, this has been $$k_{opt}^B.$$

The updater receives this optimum mode and uses a coding cost function having a first addend forming residual rate estimate depending on the prediction signal 118 obtained for the intra-prediction mode of lowest coding estimate, and a second addend forming a mode signaling side information rate estimate depending on the prediction signal and the probability value obtained for the intra-prediction mode of lowest coding cost estimate as indicated by selector 126. As indicated above, this may be done using a gradient descent. The coding cost function is, thus, differentiable and in the above mathematical representation an example of this function was given in equation 5. Here, the second add-in relating to the mode signaling side information rate estimate computed the cross entropy for the intra-prediction mode of lowest coding cost estimate.

Thus, the updater 110 seeks to update parameters 111 and 113 so as to reduce the coding cost function and then these updated parameters 111 and 113 are used by the parameterizable neural network 109 so as to process the next picture test block of the plurality 112. As discussed above with respect to section 1.5, there may be a mechanism controlling that primarily those pairs of picture test blocks 114 and their associated neighboring sample sets 116 are applied for the recursive update process for which the intra-prediction is, in rate distortion sense, advantageously done without any block sub-division, thereby avoiding that the parameters 111 and 113 are optimized too much on the basis of picture test blocks for which, anyway, a coding in units of sub-blocks thereof is more cost effective.

Figure 9A:
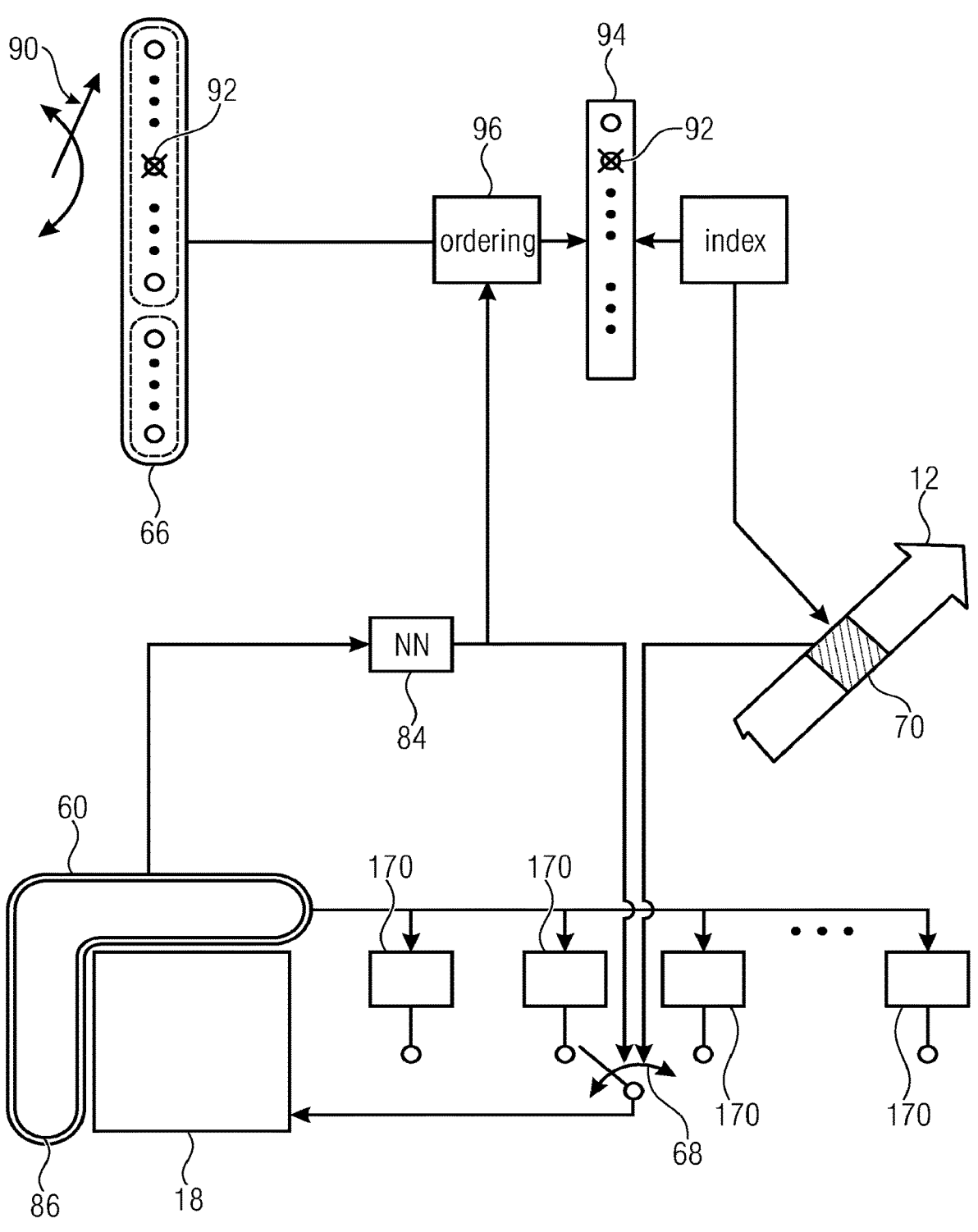
FIG. 9a shows a schematic diagram illustrating the mode of operation of encoder and decoder in accordance with an embodiment according to which a neural network is used for ordering supported intra-prediction modes irrespective of whether neural network-based or not.

So far, the above-discussed embodiments primarily concern cases where encoder and decoder had within their supported intra-prediction modes 66 a set of neural network-based intra-prediction modes. In accordance with the embodiments discussed with respect to FIGS. 9a and 9b this needs not to be the case necessarily. FIG. 9a seeks to outline the mode of operation of an encoder and a decoder in accordance with an embodiment wherein the description thereof is provided in a manner focusing on the differences to the description brought forward above with respect to FIG. 7a. The plurality 66 of supported intra-prediction modes may or may not comprise neural network-based intra-prediction modes and may or may not comprise non-neural network-based intra-prediction modes. The modules 170 in FIG. 9a comprised by encoder and decoder, respectively, in order to provide for each of the supported modes 66 the corresponding prediction signal are, accordingly, not necessarily neural networks. As already denoted above, such intra-prediction modes may be neural network-based or they may be heuristically motivated and compute the prediction signal based on a DC intra-prediction mode or an angular intra-prediction mode or any other. Accordingly, these modules 170 could be denoted as prediction signal computer. Encoder and decoder in accordance with the embodiment of FIG. 9a, however, comprise a neural network 84. The neural network 84 computes, on the basis of the neighboring sample set 86, probability values for the supported intra-prediction modes 66 so that the plurality 66 of intra-prediction modes may be turned into the ordered list 94. The index 70 within datastream 12 for block 18 points into this ordered list 94. The neural network 84, thus, assists in lowering the side information rate to be spent for the intra-prediction mode signalization.

Figure 9B:
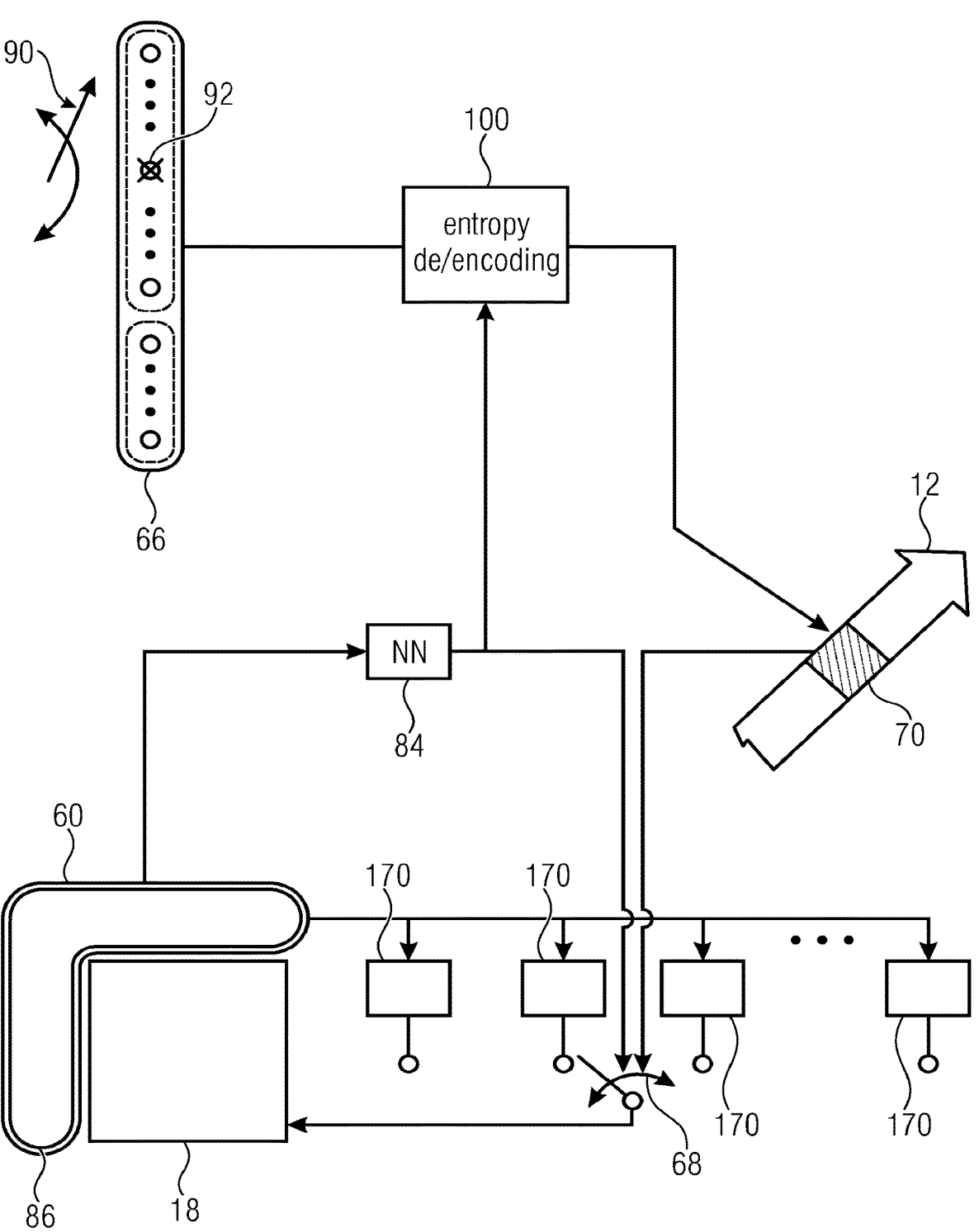
FIG. 9b shows a schematic diagram differing from FIG. 9a in that the neural network base is used for controlling the probabilities distribution estimation for entropy de/encoding of the index into the set of supported intra-prediction modes.

FIG. 9b shows an alternative to FIG. 9a in that instead of the ordering, entropy de/encoding 100 of the index 70 is used with controlling the probability or simple statistics thereof, i.e. controlling the entropy probability distribution for entropy de/encoding in en/decoder, according to the probability values determined for the neural network 84 for each mode of plurality 66.

Figure 10:
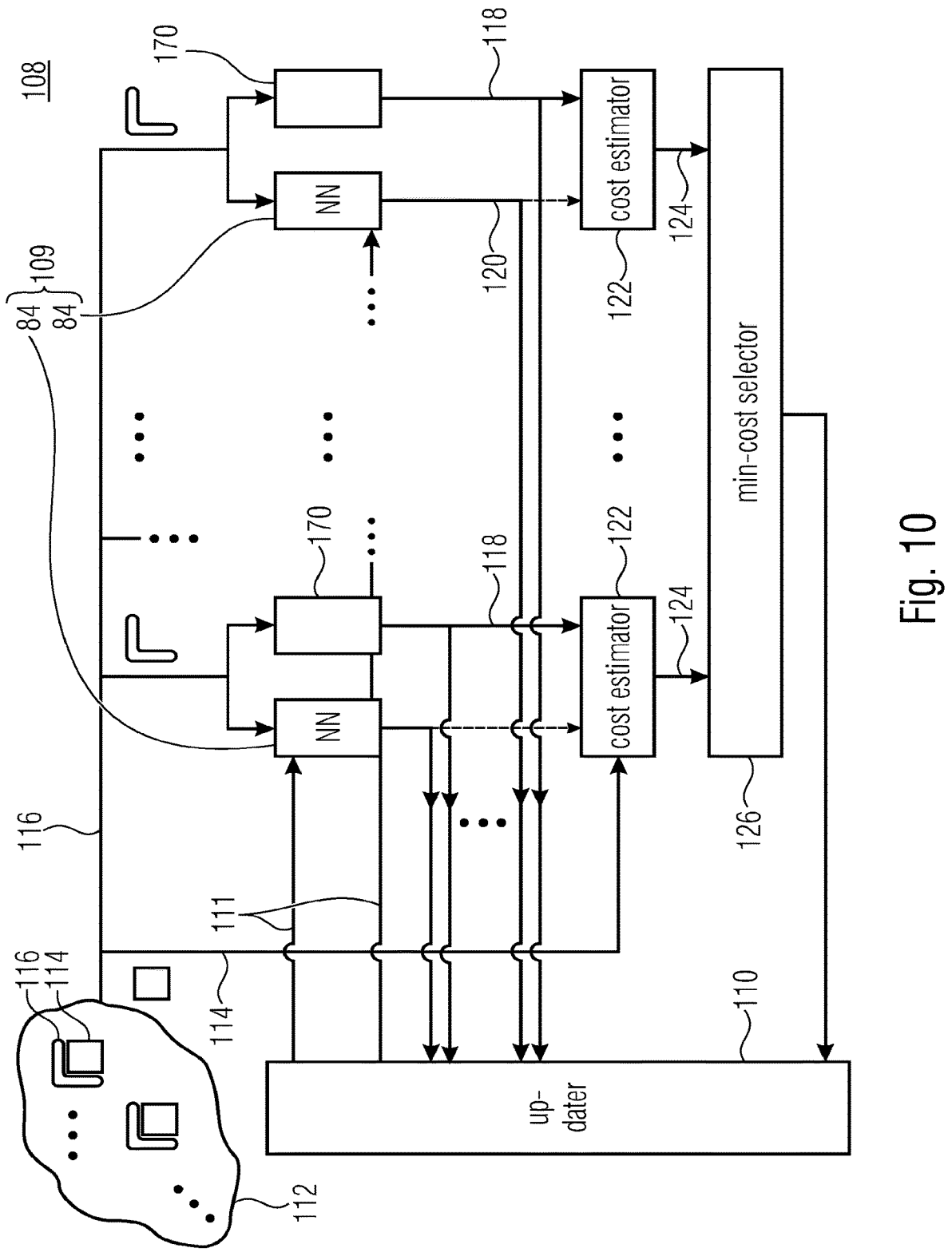
FIG. 10 shows an apparatus for designing a neural network for assisting and selecting among a set of intra-prediction mode for block-based picture coding in accordance with an embodiment.

FIG. 10 shows an apparatus for designing or parametrizing neural network 84. It is, thus, an apparatus 108 for designing a neural network for assisting in selecting among a set 66 of intra-prediction modes. Here, for each mode of set 66 there is a corresponding neural network block together forming neural network 84 and the parametrizable neural network 109 of apparatus 108 is merely parametrizable with respect these blocks. For each mode, there is also the prediction signal computer 170 which needs, however, not to be parametrizable according to FIG. 10. Thus, apparatus 108 of FIG. 10 computes costs estimates for each mode on the basis of the prediction signal 118 as computed by the corresponding prediction signal computer 170 and, optionally, on the basis of the corresponding probability value as determined by the corresponding neural network block for this mode. On the basis of the resulting costs estimates 124, the minimum cost selector 126 selects the mode of the minimum cost estimate and the updater 110 updates the parameters 111 for the neural 84.

The following is noted with respect to the description of FIGS. 7a to 7d and 9a and 9b. A common feature of the embodiments of FIGS. 9a and 9b which is also used by some of the embodiments of FIGS. 7a to 7d was the fact that the probability values of the neural network values in order to improve or reduce the overhead associated with the side information 70 for signaling the mode determined on the encoder side at the optimization process 90 to the decoder. As indicated above with respect to the embodiments of FIGS. 7a to 7d, however, it should be clear that the embodiments of FIGS. 9a and 9b may be varied to the extent that no side information 70 is spent in datastream 12 with respect to the mode selection at all. Rather, the probability values output by neural network 84 for each mode may be used to synchronize the mode selection between encoder and decoder inevitably. In that case, there would be no optimization decision 90 at the encoder side with respect to the mode selection. Rather, the mode to be used among set 66 would be determined on encoder and decoder side in the same manner. A similar statement is true with respect to corresponding embodiments of FIGS. 7a to 7d when varied so as to not use any side information 70 in datastream 12. Back to the embodiments of FIGS. 9a and 9b, it is interesting, however, that while the selection process 68 at the decoder side is dependent on the probability values output by the neural network in that the ordering or the probability distribution estimate dependency on the probability values varies the interpretation of the side information, as far as the encoder is concerned, the dependency on the probability values may not only affect the coding of the side information 70 into datastream 12 using, for instance, a respective variable length coding of an index into the ordered list or using entropy en/decoding with a probability distribution estimation depending on the neural network's probability values, but also the optimization step 90: here, the code rate for transmitting side information 70 may be taken into account and may, thus, influence the determination 90.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder configured to:
decode, from a data stream, a flag associated with a block, the flag having a first value specifies an intra-prediction mode for predicting the block is only from a first set of intra-prediction modes or having a second value specifies the intra-prediction mode for predicting the block is from a second set of intra-prediction modes, wherein:
    the first set of intra-prediction modes does not include any angular modes, DC modes, or planar modes, and
    the second set of intra-prediction modes includes a DC mode and at least one angular mode; and does not include any intra-prediction modes included in the first set of intra-prediction modes;
determine that the flag is the first value specifying that the intra-prediction mode for predicting the block is only from the first set of intra-prediction modes;
decode, from the data stream, an index indicating the intra-prediction mode from the first set of intra-prediction modes; and
predict the block using the intra-prediction mode.

2. The decoder of claim 1, further configured to:

determine an intra-prediction signal for the block by using a set of samples neighboring the block and the intra-prediction mode.

3. The decoder of claim 1, further configured to:

decode the index using a variable length code; and select the intra-prediction mode from the first set of intra-prediction modes based on the index.

4. The decoder of claim 1, further configured to:

identify a set of samples neighboring the block for predicting the block, wherein in response to the flag indicating that the intra-prediction mode for predicting the block is from the second set of intra-prediction modes, the set of neighboring samples are a one sample wide line extending alongside a left side and an upper side of the block; and wherein in response to the flag indicating that the intra-prediction mode for predicting the block is only from the first set of intra-prediction modes, the set of neighboring samples is at least two samples wide and forms an L-shape extending along the left side and the upper side of the block.

5. A method for decoding a picture from a data stream, the method comprising:

decoding, from the data stream, a flag associated with a block of the picture, the flag having a first value specifies an intra-prediction mode for predicting the block is only from a first set of intra-prediction modes or having a second value specifies the intra-prediction mode for predicting the block is from a second set of intra-prediction modes, wherein:

the first set of intra-prediction modes does not include any angular modes, DC modes, or planar modes, and the second set of intra-prediction modes includes a DC mode and at least one angular mode; and does not include any intra-prediction modes included in the first set of intra-prediction modes;

determining that the flag is the first value specifying that the intra-prediction mode for predicting the block is only from the first set of intra-prediction modes;

decoding, from the data stream, an index indicating the intra-prediction mode from the first set of intra-prediction modes; and predicting the block using the intra-prediction mode.

6. The method of claim 5, further comprising:

determining an intra-prediction signal for the block by using a set of samples neighboring the block and the intra-prediction mode.

7. The method of claim 5, further comprising:

decoding the index using a variable length code; and selecting the intra-prediction mode from the first set of intra-prediction modes based on the index.

8. The method of claim 5, further comprising:

identifying a set of samples neighboring the block for predicting the block, wherein in response to the flag indicating that the intra-prediction mode for predicting the block is from the second set of intra-prediction modes, the set of neighboring samples is a one sample wide line extending alongside a left side and an upper side of the block; and wherein in response to the flag indicating that the intra-prediction mode for predicting the block is only from the first set of intra-prediction modes, the set of neighboring samples is at least two samples wide and forms an L-shape extending along the left side and the upper side of the block.

9. A non-transitory, computer-readable medium storing instructions that, when executed by a processor of an electronic device, cause the electronic device to:

decode, from a data stream, a flag associated with a block, the flag having a first value specifies an intra-prediction mode for predicting the block is only from a first set of intra-prediction modes or having a second value specifies the intra-prediction mode for predicting the block is from a second set of intra-prediction modes, wherein:

the first set of intra-prediction modes does not include any angular modes, DC modes, or planar modes, and the second set of intra-prediction modes includes a DC mode and at least one angular mode; and does not include any intra-prediction modes included in the first set of intra-prediction modes;

determine that the flag is the first value specifying that the intra-prediction mode for predicting the block is only from the first set of intra-prediction modes;

decode, from the data stream, an index indicating the intra-prediction mode from the first set of intra-prediction modes; and predict the block using the intra-prediction mode.

10. The non-transitory, computer-readable medium of claim 9, further containing instructions that when executed cause the processor to:

determine an intra-prediction signal for the block by using a set of samples neighboring the block and the intra-prediction mode.

11. The non-transitory, computer-readable medium of claim 9, further containing instructions that when executed cause the processor to:

decode the index using a variable length code; and select the intra-prediction mode from the first set of intra-prediction modes based on the index.

12. The non-transitory, computer-readable medium of claim 9, further containing instructions that when executed cause the processor to:

identify a set of samples neighboring the block for predicting the block, wherein in response to the flag indicating that the intra-prediction mode for predicting the block is from the second set of intra-prediction modes, the set of neighboring samples is a one sample wide line extending alongside a left side and an upper side of the block; and wherein in response to the flag indicating that the intra-prediction mode for predicting the block is only from the first set of intra-prediction modes, the set of neighboring samples is at least two samples wide and forms an L-shape extending along the left side and the upper side of the block.

13. An encoder configured to:

determine whether an intra-prediction mode for encoding a block is from a first set of intra-prediction modes or a second set of intra-prediction modes, wherein:

the first set of intra-prediction modes does not include any angular modes, DC modes, or planar modes, and the second set of intra-prediction modes includes a DC mode and at least one angular mode; and does not include any intra-prediction modes included in the first set of intra-prediction modes;

encode a flag associated with the block, the flag having a first value or a second value, the first value specifying that the determined intra-prediction mode for encoding the block is only from the first set of intra-prediction modes, the second value specifying that the determined intra-prediction mode for encoding the block is from the second set of intra-prediction modes;

in response to the determination that the intra-prediction mode for encoding the block is from the first set of intra-prediction modes, encode an index indicating the intra-prediction mode from the first set of intra-prediction modes; and encode the block using the intra-prediction mode from the first set of intra-prediction modes when the flag has the first value.

14. A method for encoding a picture, the method comprising:

determining whether an intra-prediction mode for encoding a block of the picture is from a first set of intra-prediction modes or a second set of intra-prediction modes, wherein:

the first set of intra-prediction modes does not include any angular modes, DC modes, or planar modes, and the second set of intra-prediction modes includes a DC mode and at least one angular mode; and does not include any intra-prediction modes included in the first set of intra-prediction modes;

encoding a flag associated with the block, the flag having a first value or a second value, the first value specifying that the determined intra-prediction mode for encoding the block is only from the first set of intra-prediction modes, the second value specifying that the determined intra-prediction mode for encoding the block is from the second set of intra-prediction modes;

in response to determining that the intra-prediction mode for encoding the block is from the first set of intra-prediction modes, encoding an index indicating the intra-prediction mode from the first set of intra-prediction modes; and encoding the block using the intra-prediction mode from the first set of intra-prediction modes when the flag has the first value.

15. A non-transitory, computer-readable medium storing instructions that, when executed by a processor of an electronic device, cause the electronic device to:

determine whether an intra-prediction mode for encoding a block is from a first set of intra-prediction modes or a second set of intra-prediction modes, wherein:

the first set of intra-prediction modes does not include any angular modes, DC modes, or planar modes, and the second set of intra-prediction modes includes a DC mode and at least one angular mode; and does not include any intra-prediction modes included in the first set of intra-prediction modes;

encode a flag associated with the block, the flag having a first or a second value, the first value specifying that the determined intra-prediction mode for encoding the block is only from the first set of intra-prediction modes, the second value specifying that the determined intra-prediction mode for encoding the block is from the second set of intra-prediction modes;

in response to the determination that the intra-prediction mode for encoding the block is from the first set of intra-prediction modes, encode an index indicating the intra-prediction mode from the first set of intra-prediction modes; and encode the block using the intra-prediction mode from the first set of intra-prediction modes when the flag has the first value.

* * * * *